(12) United States Patent
Yanoo et al.

(10) Patent No.: US 8,484,729 B2
(45) Date of Patent: Jul. 9, 2013

(54) SECURITY OPERATION MANAGEMENT SYSTEM, SECURITY OPERATION MANAGEMENT METHOD, AND SECURITY OPERATION MANAGEMENT PROGRAM

(75) Inventors: Kazuo Yanoo, Tokyo (JP); Hiroshi Sakaki, Tokyo (JP)

(73) Assignee: NEC Corporation, Tokyo (JP)

( * ) Notice: Subject to any disclaimer, the term of this patent is extended or adjusted under 35 U.S.C. 154(b) by 527 days.

(21) Appl. No.: 12/733,797

(22) PCT Filed: May 23, 2008

(86) PCT No.: PCT/JP2008/059561
§ 371 (c)(1),
(2), (4) Date: Mar. 19, 2010

(87) PCT Pub. No.: WO2009/037897
PCT Pub. Date: Mar. 26, 2009

(65) Prior Publication Data
US 2010/0205651 A1 Aug. 12, 2010

(51) Int. Cl.
*H04L 29/06* (2006.01)
(52) U.S. Cl.
USPC .......... 726/22; 726/1; 726/26; 713/166
(58) Field of Classification Search
None
See application file for complete search history.

(56) References Cited

U.S. PATENT DOCUMENTS

| | | | |
|---|---|---|---|
| 7,739,720 B2 * | 6/2010 | Samuelsson et al. | 726/1 |
| 2006/0174319 A1 * | 8/2006 | Kraemer et al. | 726/1 |
| 2006/0242711 A1 | 10/2006 | Anzai et al. | |
| 2006/0272030 A1 * | 11/2006 | Slemmer et al. | 726/27 |

FOREIGN PATENT DOCUMENTS

| | | |
|---|---|---|
| JP | 2002-268985 | 9/2002 |
| JP | 2002-328896 | 11/2002 |
| JP | 2003-24112 | 1/2003 |
| JP | 2004-133634 | 4/2004 |
| JP | 2005-515541 | 5/2005 |
| JP | 2005-301551 | 10/2005 |
| JP | 2006-139651 | 6/2006 |
| JP | 2006-146297 | 6/2006 |
| JP | 2006-331383 | 12/2006 |
| WO | WO 03/060717 A1 | 7/2003 |

OTHER PUBLICATIONS

In H.Paul Williams, Model Building in Mathematical Programming, John Wiley and Sons, Chichester New York, 4. edition, 1999.
Vipin Kumar, "Algorithms for Constraint-Satisfaction Problems: A Survey", AI Magazine Spring 1992, pp. 32-44.

(Continued)

*Primary Examiner* — Benjamin Lanier
(74) *Attorney, Agent, or Firm* — McGinn IP Law Group, PLLC

(57) ABSTRACT

Provided is a security management system for managing the security of a managed system including during operation of the managed system, the security management system comprising: state changing means for determining a state that satisfies a state rule, which defines a desired state of the managed system, as a target state if the state of the managed system does not satisfy the state rule; and action determining means for determining a predetermined process, which is for changing the difference between the state of the managed system when the target state is determined and the target state, as a countermeasure that needs to be carried out in the state of the managed system when the target state is determined.

4 Claims, 23 Drawing Sheets

OTHER PUBLICATIONS

Nagai, et al., "An Optimal Decision Method for Establishment of Security Objectives", Information Processing Society of Japan Journal, Aug. 2000, vol. 41, No. 8.

Hyodo, et al., "A Modeling of Security Countermeasure Selection Problem", The Institute of Electronics, Information, and Communications Engineers Technique, ISEC 2003-46, Jul. 2003.

* cited by examiner

Fig.5

| STATE VARIABLE | MEANING | VALUE | ACQUISITION METHOD |
|---|---|---|---|
| x1 | NETWORK CONNECTION STATE | 0: NOT CONNECTED<br>1: CONNECTED | (NOT SHOWN) |
| x2 | NETWORK CONNECTION DESTINATION | 0: WITHIN INTRANET<br>1: INTERNET | (NOT SHOWN) |
| x3 | STATE OF ANTIVIRUS TOOL | 0: DISABLED<br>1: ENABLED | (NOT SHOWN) |
| x4 | STATE OF FILE SHARING | 0: DISABLED<br>1: ENABLED | (NOT SHOWN) |
| x5 | STATE OF CLIENT FIREWALL | 0: DISABLED<br>1: ENABLED | var fwMgr = new ActiveXObject("HNetCfg.FwMgr");<br>var profile = fwMgr.LocalPolicy.CurrentProfile;<br>WScript.Quit(profile.FirewallEnabled); |

Fig.6

| STATE RULE | MEANING |
|---|---|
| $x1 = 0$ | SAFE IF NOT CONNECTED TO NETWORK |
| $(x1 = 1)$ AND $(x2 = 1)$ AND $(x3 = 1)$ AND $((x4 = 0)$ OR $(x5 = 1))$ | IF CONNECTED TO INTERNET, ANTIVIRUS TOOL NEEDS TO BE ENABLED, AND FILE SHARING NEEDS TO BE DISABLED OR CLIENT FIREWALL NEEDS TO BE ENABLED. |
| $(x1 = 1)$ AND $(x2 = 0)$ AND $((x3 = 1)$ OR $(x5 = 1))$ | IF CONNECTED TO INTRANET, ANTIVIRUS TOOL OR CLIENT FIREWALL NEEDS TO BE ENABLED. |

Fig.7

| STATE VARIABLE | ACQUISITION METHOD |
|---|---|
| x 1 | (NOT SHOWN) |
| x 2 | (NOT SHOWN) |
| x 3 | (NOT SHOWN) |
| x 4 | (NOT SHOWN) |
| x 5 | ```
var fwMgr = new ActiveXObject("HNetCfg.FwMgr");
var profile = fwMgr.LocalPolicy.CurrentProfile;
var val = WScript.Arguments(0);
profile.FirewallEnabled = (val == 1)? ture:false;
``` |

Fig. 10

| MODEL OF STATE RULE | MEANING |
|---|---|
| $y_1 \rightarrow$<br>$(x_1 = 0) \lor$<br>$((x_2 = 0) \land ((x_3 = 1) \lor (x_5 = 1))) \lor$<br>$((x_2 = 1) \land (x_3 = 1))$ | TO PREVENT VIRUS INFECTION, NO CONNECTION TO NETWORK NEEDS TO BE MADE, CONNECTION TO INTRANET NEEDS TO BE MADE WHILE ONE OF FIREWALL AND ANTIVIRUS IS ENABLED, OR ANTIVIRUS TOOL NEEDS TO BE ENABLED. |
| $y_2 \rightarrow$<br>$(x_1 = 0) \lor$<br>$(x_2 = 0) \lor$<br>$((x_2 = 1) \land ((x_4 = 0) \lor (x_5 = 1)))$ | TO PREVENT ATTACK BY OUTSIDE CRIMINAL, NO CONNECTION TO NETWORK NEEDS TO BE MADE, NO CONNECTION TO INTERNET NEEDS TO BE MADE, OR FILE SHARING NEEDS TO BE DISABLED OR FIREWALL NEEDS TO BE ENABLED. |
| $y_3 \rightarrow$<br>$y_2 \land ((x_4 = 0) \lor (x_5 = 1))$ | TO PREVENT ATTACK BY INSIDE CRIMINAL, ATTACK BY OUTSIDE CRIMINAL NEEDS TO BE PREVENTED, AND FILE SHARING NEEDS TO BE DISABLED OR FIREWALL NEEDS TO BE ENABLED. |
| $y_4 \rightarrow$<br>$(x_4 = 1)$ | TO USE FILE SHARING, FILE SHARING NEEDS TO BE ENABLED. |
| $y_5 \rightarrow$<br>$(x_1 = 1) \land (x_2 = 1) \land (x_4 = 1)$ | TO DISCLOSE FILE ON INTERNET, CONNECTION NEEDS TO BE MADE TO INTERNET AND FILE SHARING NEEDS TO BE ENABLED. |

Fig. 11

| STATE RULE | |
|---|---|
| $(x_1 = 0) \lor ((x_2 = 0) \land (x_3 = 1) \lor (x_5 = 1)) \lor ((x_2 = 1) \land (x_3 = 1))$ | ~ g11 |
| $(x_1 = 0) \lor (x_2 = 0) \lor ((x_2 = 1) \land ((x_4 = 0) \lor (x_5 = 1)))$ | ~ g12 |
| $y_4 \rightarrow (x_4 = 1)$ | ~ g13 |
| maximize($y_4$) | ~ f11 |

Fig.13

| STATE VARIABLE | TYPE | ACTION DEFINITION |
|---|---|---|
| x1 | AUTOMATIC HANDLING | (NOT SHOWN) |
| x2 | IMMEDIATE HANDLING DIFFICULT | (NOT SHOWN) |
| x3 | MANUAL HANDLING | (NOT SHOWN) |
| x4 | AUTOMATIC HANDLING | (NOT SHOWN) |
| x5 | AUTOMATIC HANDLING | var fwMgr = new ActiveXObject("HNetCfg.FwMgr");<br>var profile = fwMgr.LocalPolicy.CurrentProfile;<br>var val = WScript.Arguments(0);<br>profile.FirewallEnabled = (val == 1)? ture:false; |

Fig.14

| STATE RULE | |
|---|---|
| $(x1 = 0)$ ∨<br>$((x2 = 0)$ ∧ $(x3 = 1)$ ∨ $(x5 = 1))$ ∨<br>$((x2 = 1)$ ∧ $(x3 = 1))$ | ~g21 |
| $(x1 = 0)$ ∨<br>$(x2 = 0)$ ∨<br>$((x2 = 1)$ ∧ $((x4 = 0)$ ∨ $(x5 = 1)))$ | ~g22 |
| $y4 \rightarrow (x4 = 1)$ | ~g23 |
| $z1 = (x4 = X4)$ | ~g24 |
| $z2 = (x2 = X2)$ | ~g25 |
| $z3 = (y4 = 1)$ | ~g26 |
| $z4 = (x3 = X3)$ | ~g27 |
| $z5 = (x1 = X1) + (x2 = X2) + (x3 = X3) + (x4 = X4) + (x5 = X5)$ | ~g28 |
| maximize$(z5 + 5z4 + 10z3 + 20z2 + 40z1)$ | ~f21 |

Fig.15

| CURRENT STATE (X1, X2, X3, X4, X5) | EVENT | ACTION THAT CAN BE EXECUTED AND STATE AFTER EXECUTION | MEANING | |
|---|---|---|---|---|
| (1, 1, 1, 0, 0) | x3 = 0 | x1 = 0 (0, 1, 0, 0, 0) | SINCE ANTIVIRUS TOOL IS DISABLED DURING INTERNET CONNECTION, CUT OFF NETWORK TO MAINTAIN SECURITY | st11 |
| | | x2 = 0 (1, 0, 0, 0, 0) | SINCE ANTIVIRUS TOOL IS DISABLED DURING INTERNET CONNECTION, RECONNECT TO INTRANET TO MAINTAIN SECURITY | st11 |
| (1, 0, 1, 0, 0) | x3 = 0 | x5 = 1 (1, 0, 0, 0, 1) | SINCE ANTIVIRUS TOOL IS DISABLED DURING INTRANET CONNECTION, ENABLE FIREWALL TO MAINTAIN SECURITY | st21 |
| | | x1 = 0 (0, 0, 0, 0, 0) | SINCE ANTIVIRUS TOOL IS DISABLED DURING INTRANET CONNECTION, CUT OFF NETWORK TO MAINTAIN SECURITY | st21 |

EXAMPLE1 { (rows 1-2)
EXAMPLE2 { (rows 3-4)

Fig.19

```
01  foreach S in TNS
02    foreach n in {1..N}
03      foreach a in d(n) such that a != S(n)
04        if S[n:a] ∈ TNS
05          // nothing to do
06        else
07          let X = {T|T∈TNS ∧ T(n)=S(n)}
08          if X = φ
09            generate δ (S[n:a], S[n:a], n:S(n))
10          else
11            let P = closest(X, s[n:a])
12            generate δ (S[n:a], P, n:S(n))
```

Fig.22

```
01  foreach S in TNS
02    foreach n in {1..N}
03      foreach a in d(n) such that a != S(n)
04        if S[n:a] ∈ TNS
05          // nothing to do
06        else
07          let X = {T|T∈TS∧T(n)=S(n)}
08          if X = φ
09            generate δ (S[n:a], S[n:a], n:S(n))
10
11          let Y = {T|T∈X∧(∀i∈{1..N}:(type(i)= IMMEDIATE EXECUTION )⇒(T(i)=S(i)))}
12          if Y = φ                              DIFFICULT
13            Y = X
14
15          if S[n:a]∈ TSA
16            let Z = Y ∩ TSA
17          else
18            let Z = Y
19
20          if Z = φ
21            Z = Y
22
23          let = W = {T|T∈Z∧(∀i∈{1..N}:(type(i)= MANUAL HANDLING )⇒(T(i)=S(i)))}
24
25          if W = φ
26            W = Z
27
28          let P = closest(W, s[n:a])
29          generate δ (S[n:a], P, n:S(n))
```

Fig.23

| MODEL OF STATE RULE | MEANING |
|---|---|
| $y1 \rightarrow$ <br> $(x1 = 0) \lor$ <br> $((x2 = 0) \land ((x3 = 1) \lor (x5 = 1))) \lor$ <br> $((x2 = 1) \land (x3 = 1))$ | TO PREVENT VIRUS INFECTION, NO CONNECTION TO NETWORK NEEDS TO BE MADE, CONNECTION TO INTRANET NEEDS TO BE MADE WHILE ONE OF FIREWALL AND ANTIVIRUS TOOL IS ENABLED, OR ANTIVIRUS TOOL NEEDS TO BE ENABLED. |
| $y2 \rightarrow$ <br> $(x1 = 0) \lor$ <br> $(x2 = 0) \lor$ <br> $((x2 = 1) \land ((x4 = 0) \lor (x5 = 1)))$ | TO PREVENT ATTACK BY OUTSIDE CRIMINAL, NO CONNECTION TO NETWORK NEEDS TO BE MADE, NO CONNECTION TO INTERNET NEEDS TO BE MADE, OR FILE SHARING NEEDS TO BE DISABLED OR FIREWALL NEEDS TO BE ENABLED. |
| $y3 \rightarrow$ <br> $y2 \land ((x4 = 0) \lor (x5 = 1))$ | TO PREVENT ATTACK BY INSIDE CRIMINAL, ATTACK BY OUTSIDE CRIMINAL NEEDS TO BE PREVENTED, AND FILE SHARING NEEDS TO BE DISABLED OR FIREWALL NEEDS TO BE ENABLED. |
| $y4 \rightarrow$ <br> $(x1 = 1) \land (x4 = 1)$ | TO USE FILE SHARING, CONNECTION TO NETWORK NEEDS TO BE MADE, AND FILE SHARING NEEDS TO BE ENABLED. |
| $y5 \rightarrow$ <br> $(x1 = 1) \land (x2 = 1) \land (x4 = 1)$ | TO DISCLOSE FILE ON INTERNET, CONNECTION TO INTERNET NEEDS TO BE MADE AND FILE SHARING NEEDS TO BE ENABLED. |

Fig.24a

| IDENTIFIER | x1 | x2 | x3 | x4 | x5 |
|---|---|---|---|---|---|
| σ0 | 0 | 0 | 0 | 0 | 0 |
| σ1 | 0 | 0 | 0 | 0 | 1 |
| σ2 | 0 | 0 | 0 | 1 | 0 |
| σ3 | 0 | 0 | 0 | 1 | 1 |
| σ4 | 0 | 0 | 1 | 0 | 0 |
| σ5 | 0 | 0 | 1 | 0 | 1 |
| σ6 | 0 | 0 | 1 | 1 | 0 |
| σ7 | 0 | 0 | 1 | 1 | 1 |
| σ8 | 0 | 1 | 0 | 0 | 0 |
| σ9 | 0 | 1 | 0 | 0 | 1 |
| σ10 | 0 | 1 | 0 | 1 | 0 |
| σ11 | 0 | 1 | 0 | 1 | 1 |
| σ12 | 0 | 1 | 1 | 0 | 0 |
| σ13 | 0 | 1 | 1 | 0 | 1 |
| σ14 | 0 | 1 | 1 | 1 | 0 |
| σ15 | 0 | 1 | 1 | 1 | 1 |
| σ17 | 1 | 0 | 0 | 0 | 1 |
| σ19 | 1 | 0 | 0 | 1 | 1 |
| σ20 | 1 | 0 | 1 | 0 | 0 |
| σ21 | 1 | 0 | 1 | 0 | 1 |
| σ22 | 1 | 0 | 1 | 1 | 0 |
| σ23 | 1 | 0 | 1 | 1 | 1 |
| σ28 | 1 | 1 | 1 | 0 | 0 |
| σ29 | 1 | 1 | 1 | 0 | 1 |
| σ31 | 1 | 1 | 1 | 1 | 1 |

| IDENTIFIER | x1 | x2 | x3 | x4 | x5 |
|---|---|---|---|---|---|
| σ16 | 1 | 0 | 0 | 0 | 0 |
| σ18 | 1 | 0 | 0 | 1 | 0 |
| σ24 | 1 | 1 | 0 | 0 | 0 |
| σ25 | 1 | 1 | 0 | 0 | 1 |
| σ26 | 1 | 1 | 0 | 1 | 0 |
| σ27 | 1 | 1 | 0 | 1 | 1 |
| σ30 | 1 | 1 | 1 | 1 | 0 |

| IDENTIFIER | x1 | x2 | x3 | x4 | x5 |
|---|---|---|---|---|---|
| σ19 | 1 | 0 | 0 | 1 | 1 |
| σ22 | 1 | 0 | 1 | 1 | 0 |
| σ23 | 1 | 0 | 1 | 1 | 1 |
| σ31 | 1 | 1 | 1 | 1 | 1 |

| EVENT | STATE BEFORE NOTIFICATION | STATE AFTER CHANGE |
|---|---|---|
| $x1 \leftarrow 1$ | (0, 0, 0, 0, 0) | (1, 0, 0, 0, 1) |
| $x3 \leftarrow 0$ | (1, 0, 1, 0, 0) | (1, 0, 0, 0, 1) |
| $x5 \leftarrow 0$ | (1, 0, 0, 0, 1) | (0, 0, 0, 0, 0) |
| $x1 \leftarrow 1$ | (0, 0, 0, 1, 0) | (1, 0, 0, 1, 1) |
| $x3 \leftarrow 0$ | (1, 0, 1, 1, 0) | (1, 0, 0, 1, 1) |
| $x5 \leftarrow 0$ | (1, 0, 0, 1, 1) | (1, 0, 1, 1, 0) |
| $x1 \leftarrow 1$ | (0, 1, 0, 0, 0) | (1, 1, 1, 0, 0) |
| $x3 \leftarrow 0$ | (1, 1, 1, 0, 0) | (0, 1, 0, 0, 0) |
| ... | ... | ... |

SECURITY OPERATION MANAGEMENT SYSTEM, SECURITY OPERATION MANAGEMENT METHOD, AND SECURITY OPERATION MANAGEMENT PROGRAM

TECHNICAL FIELD

The present invention relates to a security operation management system, a security operation management method, and a program for security operation management for managing the security of a managed system including during operation of the managed system.

BACKGROUND ART

As the dependency of system on the ICT (Information and Communication Technology) technique increases, the importance of information security is further increasing. Consequently, various security tools have been put into practical use in recent years, and a multiplicity of organizations keep implementing the security tools. On the other hand, it is not easy to operate and manage various security tools and maintain the system security. This is a major problem in security management for a multiplicity of organizations.

An object of the security management is to carry out a countermeasure to vulnerability of security in accordance with the degree of risk. The vulnerability herein includes not only the vulnerability of software (for example, bugs) operated in the system, but also includes all incidents that bring about threats to the security. For example, for a threat "data leakage", an incident that a PC (Personal Computer) can be easily carried (the PC is a note PC) is also one of the vulnerabilities.

Security management needs to be carried out not only during designing and implementation of the system, but also during operation. Security management carried out also during operation will be called security operation management to distinguish the management from the security management carried out only during designing and implementation.

In relation to security operation management, a method of defining the association between the vulnerability of security and countermeasures to perform the security operation management based on the association is proposed in, for example, JP 2003-242112A (hereinafter, called Patent Document 1) and JP 2005-515541A (hereinafter, called Patent Document 2).

A security operation management system described in Patent Document 1 comprises: a device setting information DB that holds setting information of a network server; a security information DB that holds diagnostic items for detecting a security problem and handling information of the security problem; and a diagnostic module that verifies the security problem of the network server based on the setting information held in the device setting information DB to deliver a security countermeasure. The diagnostic module disclosed in Patent Document 1 acquires diagnostic items for detecting a security problem from the security information DB and verifies whether there is a security problem in a network server based on the setting information in relation to the diagnostic items. The diagnostic module then acquires handling information from the security information DB, if there is a security problem, and compares the handling information with the setting information to deliver a security countermeasure.

Patent Document 2 discloses a method of delivering, for an incidence (hereinafter, called event) discovered by acquiring information related to a managed system, a process (hereinafter, called action) executed for the managed system to maintain the security based not on a simple correspondence table, but on "a series of logic rules (specifically, logic rules worked out by associating parameter values with bit patterns)". Hereinafter, a method of delivering a security countermeasure based on a predetermined correspondence between events and actions as described in Patent Document 1 and Patent Document 2 will be called Related Art 1.

Furthermore, a method of generating an optimal combination of security countermeasures during designing of system by using and describing rules associating security risks with countermeasures that need to be carried out in a fault tree or a chart showing weights is described, for example, in JP 2004-133634A (hereinafter, called Patent Document 3), Nagai, et al., "Proposition of Optimal Determination Technique of Security Countermeasure Target", Information Processing Society of Japan Journal, 2000, Vol. 41, No. 8 (hereinafter, called Non-Patent Document 1), and Hyodo, et al., "Modeling of Security Countermeasure Selection Problem", The Institute of Electronics, Information, and Communications Engineers Technique, ISEC 2003-46, July 2003 (hereinafter, called Non-Patent Document 2). Hereinafter, a method of generating a combination of optimal security countermeasures during system setting using a rule describing the relationship between security risks and countermeasures as described in Patent Document 3 and Non-Patent Documents 1 and 2 will be called Related Art 2.

A major object of Related Arts 1 and 2 is to irreversibly apply corrective measures to vulnerability. However, in the actual security operation management, the security countermeasures often need to be switched in accordance with the changes in the system, in consideration of the balance between the security risk and the operational efficiency.

For example, the security countermeasures that need to be carried out are switched between when a PC is used in an intranet that is protected in terms of security and when the PC is connected to the public Internet for use. This is because a security threat that can be ignored when a PC is used in an intranet needs to be handled when the PC is connected to the public Internet, since there may be attacks from malicious third parties around the world. Conversely, the possibility of being attacked is low when the PC is connected to the intranet, and there is a demand for prioritizing the operational efficiency to execute a network service and the like (for example, file sharing function).

Therefore, to deliver security countermeasures applied to a portable PC such as a note PC, it is desirable to be able to handle which item is a threat and to switch what kind of countermeasure to take for the threat, depending on the state of the system, such as whether the PC is connected to the Internet or to an intranet.

However, in general, a system has a multiplicity of states. Therefore, in the method of delivering security countermeasures based on the predetermined association between the events and the actions, as in Related Art 1, it is difficult to describe a definition (definition of association between events and actions) for delivering an optimal countermeasure for each state. For example, when predetermined corrective measures are just irreversibly applied to individual vulnerabilities, if the current state is not in a target state, which is a state in which all predetermined corrective measures are carried out, such as when a new definition of vulnerability is added, only a state change for moving to the target state exists, and as shown in FIG. 1a, the number of state changes and the number of states are equivalent. However, when the security countermeasures are mutually switched in accordance with the changes in the system, the number of state changes is far greater than the number of states as shown in FIG. 1b. FIG. 1b shows an example when the condition of the system can be expressed by four states, in which the state changes to different target states in accordance with changes in the system under the condition. For example, under the condition corresponding to state 1, state 2 is the target state when a certain change occurs. State 3 or state 4 may be the target state depending on the change that occurred. When an attempt is made to realize the execution of reversible countermeasures, such as switching the security countermeasures in accordance with the changes in the system, by the method describing actions for events as in Related Art 1, conditions need to be set in accordance with the states. It is difficult to comprehensively and consistently describe the definition of the association between the events and the actions including conditioning in accordance with the states.

As compared to Related Art 1, in which the association between the events and the actions are fully described in accordance with the states, Related Art 2 describes the relationship between the security risks and the countermeasures as a rule. Therefore, it is easy to make a comprehensive and consistent description. However, an object of Related Art 2 is to support the system design taking into consideration the security risks, and detecting in which condition the current system is and determining a security countermeasure based on the content of the detection are not taken into consideration. Therefore, a formulation method and the like of rules that anticipate situations in which the optimal security countermeasures change depending on the states are not mentioned, and automatic switching of optimal security countermeasures cannot be carried out during operation of the managed system.

DISCLOSURE OF THE INVENTION

An object of the present invention is to provide a security operation management system, a security operation management method, and a security operation management program capable of easily, comprehensively, and consistently carrying out security countermeasures in accordance with state changes of a system.

The present invention provides a security operation management system for managing the security of a managed system including during operation of the managed system, the security operation management system comprising: state changing means for determining a state satisfying a state rule, which defines a desired state of the managed system, as a target state if the state of the managed system does not satisfy the state rule; and action determining means for determining a predetermined process, which is a process for changing the difference between the state of the managed system when the target state is determined and the target state, as a countermeasure that needs to be carried out in the state of the managed system when the target state is determined.

The present invention provides a security operation management method for managing the security of a managed system including during operation of the managed system, the security operation management method comprising: determining a state satisfying a state rule, which defines a desired state of the managed system, as a target state if the state of the managed system does not satisfy the state rule; and determining a predetermined process, which is a process for changing the difference between the state of the managed system when the target state is determined and the target state, as a countermeasure that needs to be carried out in the state of the managed system when the target state is determined.

The present invention provides a program for security operation management for managing the security of a managed system including during operation of the managed system, the program for security operation management causing a computer to execute: a state changing procedure for determining a state satisfying a state rule, which defines a desired state of the managed system, as a target state if the state of the managed system does not satisfy the state rule; and an action determining procedure for determining a predetermined process, which is a process for changing the difference between the state of the managed system when the target state is determined and the target state, as a countermeasure that needs to be carried out in the state of the managed system when the target state is determined.

According to the present invention, security countermeasures can be easily, comprehensively, and consistently carried out in accordance with state changes of a system.

BRIEF DESCRIPTION OF THE DRAWINGS

FIG. 5 is a diagram showing an example of an event definition stored in event definition storing means shown in FIG. 3;

FIG. 6 is a diagram showing an example of state rules stored in state rule storing means shown in FIG. 3;

FIG. 7 is a diagram showing an example of an action definition stored in action definition storing means shown in FIG. 3;

FIG. 10 is a diagram showing an example of state models stored in model storing means shown in FIG. 8;

FIG. 11 is a diagram showing an example of state rules delivered in the second exemplary embodiment;

FIG. 13 is a diagram showing an example of an action definition stored in action definition storing means according to the third exemplary embodiment;

FIG. 14 is a diagram showing an example of state rules delivered in the second exemplary embodiment;

FIG. 15 is a diagram showing an example of state changes according to the third exemplary embodiment;

FIG. 19 is a diagram using a pseudo code to show an algorithm of a generation process of a state change rule of state change rule generating means shown in FIG. 18;

FIG. 22 is a diagram using a pseudo code to show an algorithm of the generation process of state change rules by the policy compiling means shown in FIG. 20;

FIG. 23 is a diagram showing another example of state models stored in the model storing means shown in FIG. 20;

FIG. 24a is a diagram showing an example of state set TS satisfying security requirements;

BEST MODE FOR CARRYING OUT THE INVENTION (First Exemplary Embodiment)

Hereinafter, a first exemplary embodiment will be described with reference to the drawings.

Figure 2:
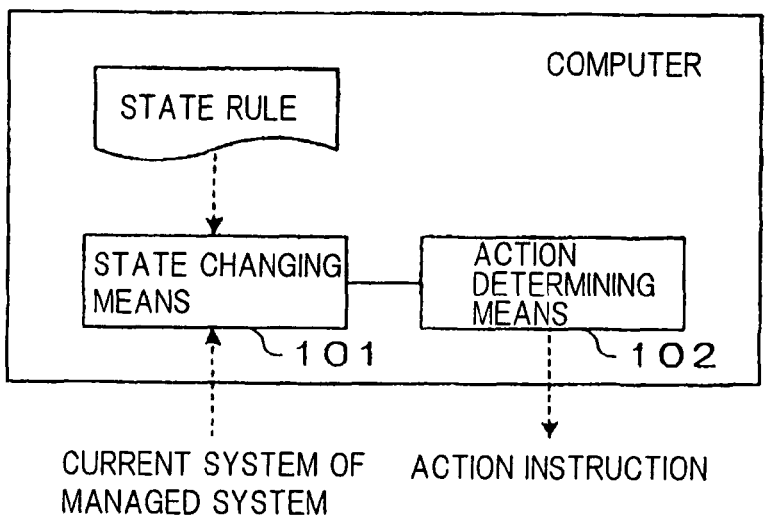
FIG. 2 is a block diagram showing a configuration example of a security operation management system according to a first exemplary embodiment.

FIG. 2 is a block diagram showing a configuration example of a security operation management system according to the first exemplary embodiment.

As shown in FIG. 2, the security management system according to the exemplary embodiment comprises state changing means 101 and action determining means 102.

State changing means 101 treats a detected state (specifically, incidence recognized as setting condition or vulnerability) of a managed system as an input, and based on state rules, searches (determines) a state after change as a target state if a state change is necessary.

Here, the state rule is information indicating a desired state of the managed system, and in the exemplary embodiment, is information indicated as a constraint equation related to predetermined variables (hereinafter, called state variables) allocated to diagnostic items related to the security of the managed system. The constraint equation is an equation for limiting the values that the variables (in this case, state variables) can take, and specifically, is information including variables, atoms (basic data that cannot be dissolved any more) indicating numeric values, and operators indicating magnitude relations, such as = and $\leq$, and logical relationships, such as AND (logical product), OR (logical sum), and NOT (negation). Operators (assignment operators) for directly changing the values of the variables are not included in the constraint equation ("=" described above is shown as an operator indicating an equal sign).

Action determining means 102 determines an action necessary to change the state of the managed system from the current state to the state after change determined as the target state. Specifically, action determining means 102 determines an action, which is necessary to change the values of items expressing the current state to the values of the items in the system state determined as the target state in relation to the items with values (state values of settings and vulnerability) different from the values of the items expressing the state of system as the target state, as an action that needs to be executed. Action determining means 102 may determine the action that needs to be executed by searching an action that can change the values of the relevant items based on a predetermined action definition.

Hereinafter, this will be described using a more specific configuration example.

Figure 3:
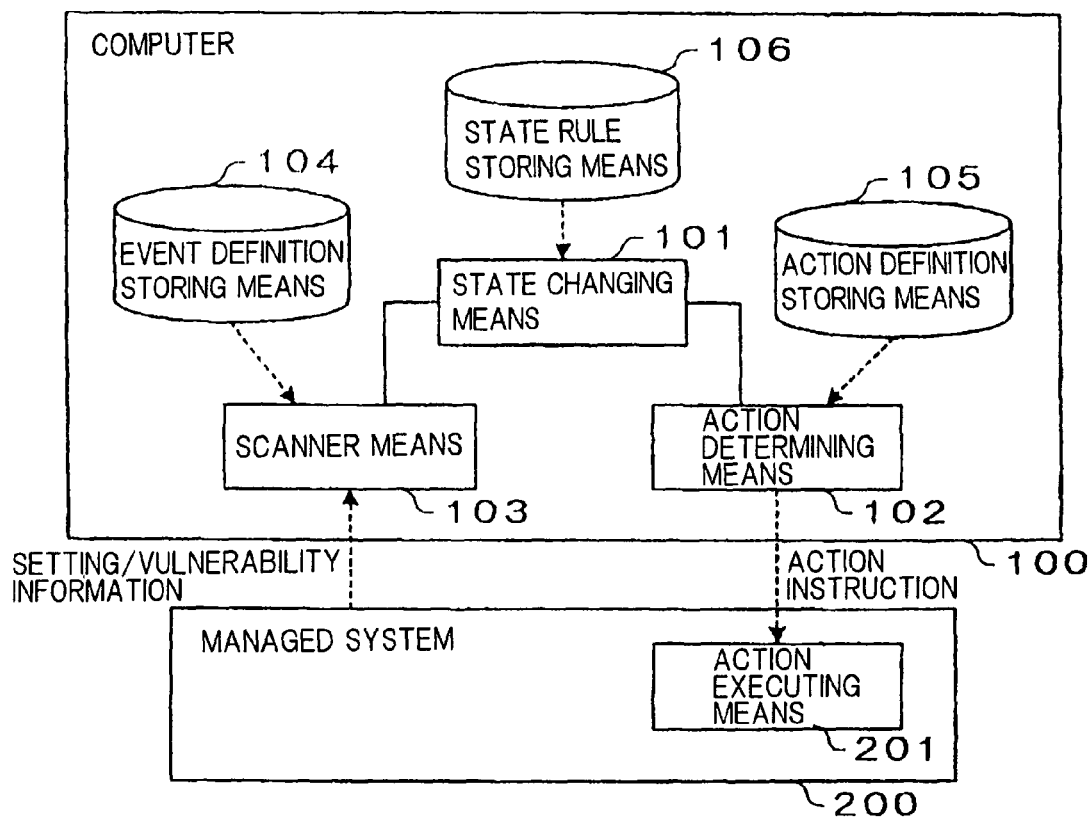
FIG. 3 is a block diagram showing a more specific configuration example of the security operation management system according to the first exemplary embodiment.

FIG. 3 is a block diagram showing a more specific configuration example of the security operation management system according to the first exemplary embodiment.

The security operation management system shown in FIG. 3 comprises computer 100 and managed system 200.

Computer 100 is a computer comprising a central processing unit, a processor, a data processing apparatus, and the like operated by program control and includes state changing means 101, action determining means 102, as well as scanner means 103, event definition storing means 104, action definition storing means 105, and state rule storing means 106. Managed system 200 includes action executing means 201. Scanner means 103 may be included in managed system 200. Computer 100 may be managed system 200. In that case, action executing means 201 is included in computer 100.

Scanner means 103 collects information indicating setting of managed system 200 (hereinafter, called setting information) and information indicating vulnerability (hereinafter, called vulnerability information). Based on an event definition stored in event definition storing means 104, scanner means 103 converts the collected setting information and vulnerability information into events and inputs the events into state changing means 101.

Event definition storing means 104 stores the event definition. Here, the event definition is information including state variables indicating states of settings and vulnerability of managed system 200 and information indicating acquisition methods of the values.

In the present example, state changing means 101 performs, if necessary, a state change of an event (information indicating the current state of managed system 200) inputted from scanner means 103, based on state rules stored in state rule storing means 106. In other words, state changing means 101 searches (determines) a state after change as a target state.

State rule storing means 106 stores the state rules in the present example. Specifically, state rule storing means 106 stores state rules indicating desired conditions of managed system 200 described in a format of a constraint equation in relation to state variables corresponding to items (setting items and vulnerability related to information security of managed system) collected by scanner means 103.

In the present example, based on the action definition stored in action definition storing means 105, action determining means 102 determines an action, which can change the state of the managed system from the current state to the state after change determined as the target state, as a countermeasure that needs to be carried out.

Action definition storing means 105 stores the action definition. Here, the action definition is information describing methods (such as operation methods) for changing incidents recognized as settings and vulnerability of managed system 200.

Action executing means 201 executes the action determined by action determining means 102, changes settings of managed system 200, and changes incidents recognized as vulnerability.

In the present example, state changing means 101, action determining means 102, and scanner means 103 are specifically realized by a central processing unit, a processor, a data processing apparatus, and the like included in computer 100 and operated by program control. Event definition storing means 104, action definition storing means 105, and state rule storing means 106 are realized by a storage device included in computer 100. Action executing means 201 is realized by, for example, a central processing unit, a processor, a data processing apparatus, and the like included in managed system 200 and operated by program control.

Next, an operation of the exemplary embodiment will be described.

Figure 4:
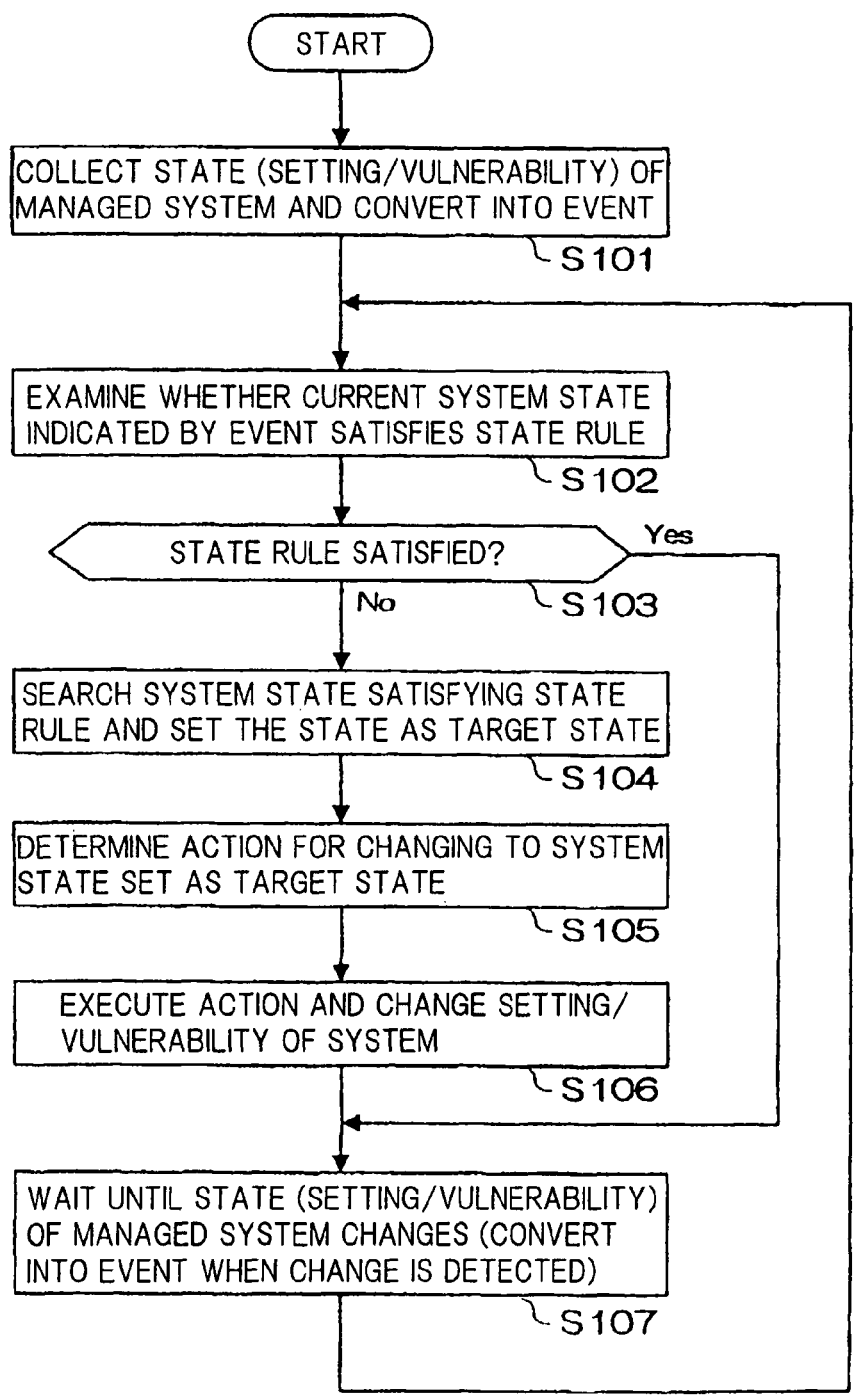
FIG. 4 is a flow chart showing an operation example of the first exemplary embodiment.

FIG. 4 is a flow chart showing an operation example of the first exemplary embodiment.

As shown in FIG. 4, in step S101, scanner means 103 first checks an incident recognized as setting of managed system 200 or vulnerability existing on managed system 200 based on the event definition when managed system 200 is activated and converts the incident into an event. Specifically, scanner means 103 collects the current state, which is defined as diagnostic items, of the incident recognized as setting or vulnerability of managed system 200 and converts the collected current state of the diagnostic items into values in which state variables allocated to the diagnostic items can take to thereby generate event variables indicating the system state at this point.

FIG. 5 is a diagram showing an example of the event definition stored in event definition storing means 104 shown in FIG. 3.

In the example shown in FIG. 5, five variables x1 to x5 are defined as state variables. The state variables are allocated to a network connection state (state variable x1), a network connection destination (state variable x2), a state of antivirus tool (state variable x3), a state of file sharing (state variable x4), and a state of client firewall (state variable x5). In the example, all state variables are defined to take two kinds of values, 0 or 1. The state variables can be defined to take more than two kinds of values.

The states of the diagnostic items can be collected by executing a script, installing and executing a program for collecting states, interpreting a log of an existing vulnerability management tool, or using an interface for system management such as WMI (Windows Management Instrumentation). In the example shown in FIG. 5, a method of using JScript of Windows to acquire the state of Windows Firewall is specifically shown as the acquisition method. Scanner means 103 can execute such a script on managed system 200 and set the Exit code as a value of the relevant state variable to assign the value to an event variable in a predetermined format to thereby carry out the operation of step S101. Scanner means 103 may set state variables, which indicate the current state of managed system 200 by values stored in the state variables, as a state change event and input the state change event into state changing means 101 when, for example, one of the items is changed. The event variable may be, for example, a variable storing a value combining the values stored in the state variables in a predetermined order. In the exemplary embodiment, state changing means 101 only needs to acquire the values of the state variables indicating the current system state when there is a change in one of the items. By the way, Windows is a registered trademark.

Next, state changing means 101 determines a target state based on values of event variables inputted as state change events (set of values stored in the state variables indicating the current state of managed system 200) and the state rule stored in state rule storing means 106. Here, in step S102, state changing means 101 examines whether the current system state indicated by the set of values stored in the state variables satisfies the state rule stored in state rule storing means 106.

FIG. 6 is a diagram showing an example of the state rule stored in state rule storing means 106 shown in FIG. 3.

In the example shown in FIG. 6, the following three state rules are defined. The state rules are designed to be combined by OR. More specifically, satisfying of one of the three state rules shows a desired condition of managed system 200.

State rule 1: $x=0$
State rule 2: $(x1=1) AND (x2=1) AND (x3=1) AND ((x4=0) OR (x5=1))$
State rule 3: $(x1=1) AND (x2=0) AND ((x3=1) OR (x5=1))$ State rule 1 means that it is safe if there is no connection to a network. State rule 2 means that if there is a connection to the Internet, an antivirus tool needs to be enabled, and file sharing needs to be disabled or a client firewall needs to be enabled. State rule 3 means that when there is a connection to an intranet, an antivirus tool or a client firewall needs to be enabled.

In step S103, if the state rule is satisfied, it can be stated that the current state of managed system 200 is in a condition in which there is no security problem (desired condition). Therefore, a state change is not performed. More specifically, the process moves to step S107, and then nothing is performed and a standby state is set until scanner means 103 detects a change in an incident recognized as setting or vulnerability of managed system 200. For example, when the state rule shown in FIG. 6 is stored, the case in which values $(x1,x2,x3,x4,x5)=(1,0,1,-,-)$ are obtained as event variables represents this (here, state rule 3 is satisfied). By the way, "-" indicates that any value can be set.

On the other hand, if the state rule is not satisfied in step S103, it can be stated that the current state of managed system 200 is in a condition in which there is a security problem (undesired condition). Therefore, in step S104, state changing means 101 searches the state, or a combination of state variables, of managed system 200 that satisfies the state rule and sets the state as a target state. The combination of variables satisfying such a constraint can be calculated using, for example, a known algorithm for solving a constraint satisfaction problem as described in Vipin Kumar, "Algorithms for Constraint-Satification Problems: A Survey", AI Magazine SPRING 1992, p. 32-44 or a known algorithm for solving an integer design problem as described in H. Paul Williams, "Model Building in Mathematical Programming, John Wiley and Sons, Chichester N.Y., 4. edition, 1999.

For example, a solution by backtracking may be used as an algorithm for solving the constraint satisfaction problem. This is a method in which values are sequentially assigned to the variables in the constraint equation. If part of another constraint equation does not work out as a result, the process returns to the assignment to variables with other selections, and other values are assigned. Ultimately, variables satisfying all constraint equations are found. Furthermore, a constraint propagation method for checking the consistency between constraints to improve the efficiency or accelerating means with optimized order of variables for assignment may be used.

Furthermore, for example, a solution by a branch and bound method may be used as an algorithm for solving the integer design problem. In the method, a property in which fast solving is possible by a simplex method or the like if a variable is not an integer is used, the constraint in which a variable is an inter is removed to first solve the problem, and the problem is divided into sub-problems including constraint equations in which divisions are made at ranges of variables where the solution is not an integer. If a sub-problem is not expected to have a solution better than the solution obtained by another sub-problem, the sub-problem is removed to deliver an optimal solution fast. Furthermore, accelerating means, such as a cutting plane method for adding a cutting plane, which removes a solution that does not result in an integer, as a constraint equation and a branch cutting method with a combination of the cutting plane method and the branch and bound method, may be used.

For example, when the state rule shown in FIG. 6 is stored, the case in which values (x1,x2,x3,x4,x5)=(1,1,1,1,0) are obtained as event variables represents this (thus, none of state rules 1 to 3 is satisfied). In this case, state changing means 101 searches a combination of state variables satisfying the state rule. The search result may be, for example, (x1,x2,x3,x4,x5)=(1,1,1,1,1). The state of managed system 200 indicated by the searched combination of state variables satisfying the state rule is set as the target state.

Next, in step S105, action determining means 102 determines an action for changing the system state so that the combination of values of the state variables indicating the current system state becomes the combination of values of the state variables as the target state. Specifically, for the state variables with values different from the values of the state variables as the target state, action determining means 102 searches an action necessary to change the current values to the values of the state variables as the target state from the action definition stored in action definition storing means 105.

FIG. 7 is a diagram showing an example of the action definition stored in action definition storing means 105 shown in FIG. 3.

As shown in FIG. 7, the action definition may be information associating the state variables with information of actions executed to change the values. The actions may be indicated as, for example, the contents of execution files described using a scripting language. In that case, the file names or the like of the execution files may be associated as the information of the actions. In the example shown in FIG. 7, for example, the content of JScript is shown as an action for changing state variable x5. In the example, a value to be changed on managed system 200 can be set as an argument to execute the JScript to thereby enable or disable a Windows Firewall as an item corresponding to state variable x5.

If there is no means for mechanically changing an incident recognized as setting or vulnerability, a script for warning the user to change the setting may be defined as an action. For example, when the user attempts to change the connection destination of network, the replacement of cable or the movement of location is necessary. If the connection destination cannot be mechanically changed, a script for displaying a warning prompting the user to change the connection destination of network can be defined as an action.

In step S106, action executing means 201 executes the action determined by action determining means 102 and changes the incident recognized as setting or vulnerability of managed system 200. In the example above, a script for enabling the client firewall is executed. As a result, the client firewall is enabled.

As described, according to the configuration of the exemplary embodiment, the rule of security operation management is described and held as the state rule defining a desired security state. When the current state of the system is notified, the target state for the state is determined, and an action is executed to achieve the target state. Therefore, security countermeasures can be comprehensively and consistently realized in accordance with state changes of the system.

Furthermore, compared to Related Arts fully describing the association between events and actions in accordance with the state, only desired security information needs to be described. Therefore, information that needs to be described can be significantly decreased, allowing easier comprehensive and consistent realization of security countermeasures in accordance with state changes of the system. As a result, the quality of security operation management can be improved, while reducing man-hours.

(Second Exemplary Embodiment)

Next, a second exemplary embodiment will be described.

Figures 8, 9:
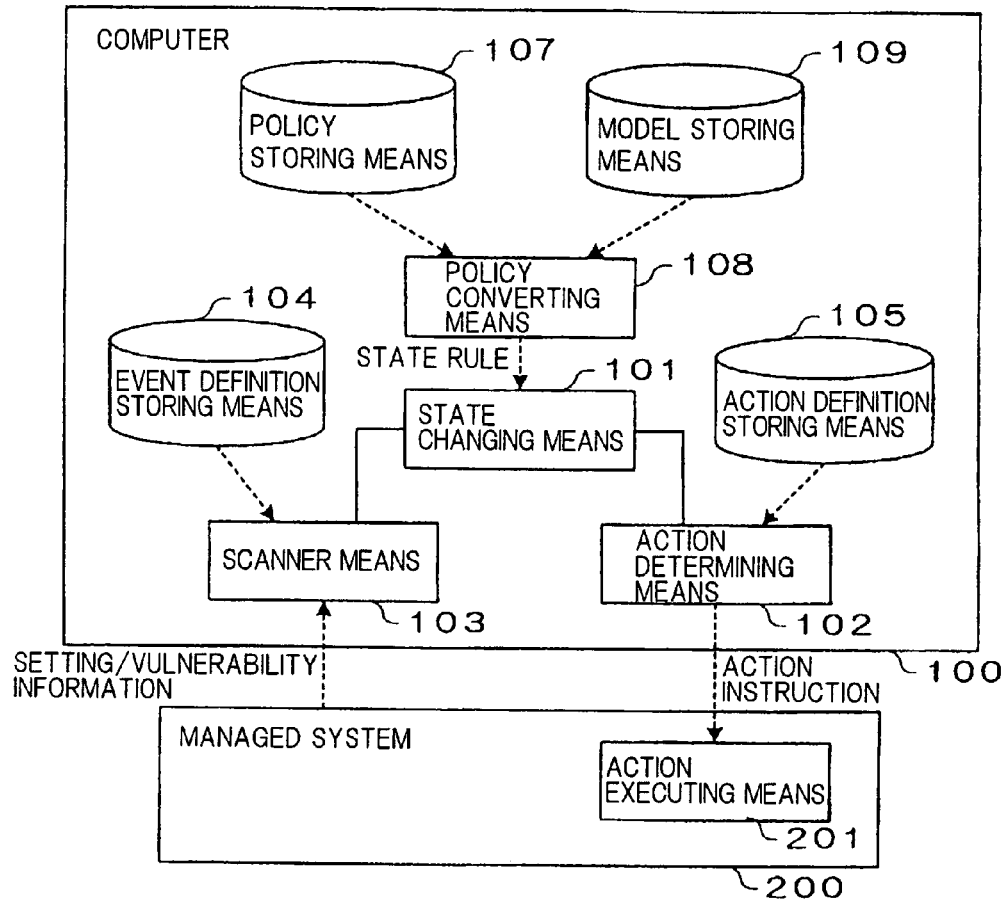
FIG. 8 is a block diagram showing a configuration example of the security operation management system according to a second exemplary embodiment.
FIG. 9 is a diagram showing an example of policy information stored in policy storing means shown in FIG. 8.

FIG. 8 is a block diagram showing a configuration example of the security operation management system according to the second exemplary embodiment.

Compared to the first exemplary embodiment shown in FIG. 3, the security operation management system shown in FIG. 8 is different in that policy storing means 107, policy converting means 108, and model storing means 109 are included in place of state rule storing means 106.

Policy storing means 107 stores information indicating policy defining requirements for managed system 200 to carry out the security operation management (hereinafter, called policy information).

FIG. 9 is a diagram showing an example of the policy information stored in policy storing means 107 shown in FIG. 8.

In general, there are a plurality of requirements for managed system 200. In the exemplary embodiment, for example, as shown in FIG. 9, requirements are defined as policy variables, and a set of the requirements indicated by a combination of the policy variables is referred to as a policy. The values of the policy variables defined in the policy information are 1 when the requirements are satisfied and are 0 when the requirements are not satisfied.

The security manager may register the definition of the policy variables, which correspond to the requirements that need to be satisfied, as the policy information or may register the definition after associating the policy variables defined in advance with enabling flags (enable=1/disable=0) indicating which requirements need to be satisfied. The requirements can be classified into, for example, requirements denoting security requirements indicating what kinds of security threats need to be handled in the system and requirements denoting convenience requirements indicating what kinds of services need to be realized. Policy storing means 107 also holds the types of requirements as policy information.

The example shown in FIG. 9 illustrates that five requirements are allocated to and defined in policy variables y1 to y5.

Policy variable y1: security requirement "handle threat of virus (prevent virus infection)"

Policy variable y2: security requirement "perform outside criminal countermeasure (prevent attack by outside criminal)"

Policy variable y3: security requirement "perform inside criminal countermeasure (prevent attack by inside criminal)"

Policy variable y4: convenience requirement "use file sharing"

Policy variable y5: convenience requirement "disclose file on Internet"

In the example shown in FIG. 9, the outside criminal denotes the type who attacks by invasion through an external network and does not include the type who attacks by invading a building. The inside criminal denotes the type who attacks by invasion through an internal network (intranet herein).

Model storing means 109 stores state rules, which correspond to the requirements defined as a policy, as state models. In other words, it can be stated that the state models are constraint equations defining the system states when the requirements defined as a policy are satisfied.

FIG. 10 is a diagram showing an example of the state model stored in model storing means 109 shown in FIG. 8.

The state models shown in FIG. 10 show an example of describing the system states, the system states when the requirements defined as a policy are satisfied, by conditional proposition logical expressions (here, refers to logical expressions in a format of A→B) using corresponding policy variables. FIG. 10 shows an example of a state model related to requirements when policy variable y1 is allocated, and FIG. 10 indicates that the following constraint equation (right side of conditional proposition logical expression) needs to be satisfied to satisfy the requirements shown with policy variable y1.

$$y \to (x1=0) \lor ((x2=0) \land ((x3=1) \lor (x5=1))) \lor ((x2=1) \land (x3=1))$$

This indicates, to prevent virus infection, it is necessary that there is no connection to the network, there needs to be a connection to the intranet and one of a firewall and an antivirus tool needs to be enabled, or an antivirus tool needs to be enabled.

Policy converting means 108 delivers the state rule based on the policy information stored in policy storing means 107 and the state model stored in the model storing means 109. The exemplary embodiment illustrates an example of a state rule, in which information is delivered indicating a desired state of the managed system by a constraint equation and an objective function related to state variables. The objective function is information indicated in order to maximize or minimize a function related to a variable to designate an optimal value that the variable needs to take. More specifically, policy converting means 108 delivers a constraint equation, which is for limiting the values that the state variables can take, and an objective function, which is for designating optimal values that the state variables need to take, as state rules to set the state of managed system 200 when as many of the requirements for managed system 200 are satisfied as many as possible. The objective function for designating the optimal values that the state variables need to take can be indicated in order to, for example, define a constraint equation for using state variables to limit the values that the policy variables, which indicate whether the requirements are satisfied, can take and a function that is maximum (or minimum) when all policy variables satisfy the requirements and then make the function maximum (or minimum).

In the example, state changing means 101 performs a state change based on the state rule converted by policy converting means 108. Other points are the same as in the first exemplary embodiment.

In the example, specifically, policy converting means 108 is realized by a central processing unit, a processor, a data processing apparatus, and the like included in computer 100 and operated by program control. Policy storing means 107 and model storing means 109 are realized by a storage device included in computer 100.

Next, a state rule delivery process executed by policy converting means 108 in the exemplary embodiment will be described. Here, an example will be described in which the example shown in FIG. 9 is registered as the policy information, and the example shown in FIG. 10 is registered as the state models. It is assumed that the enabling flag of the policy variables set by the security manager is (Y1,Y2,Y3,Y4,Y5)= (1,1,0,1,0). By the way, Y1 to Y5 correspond to policy variables y1 to y5, respectively, and denote values of the enabling flag indicating whether the requirements corresponding to the policy variables are enabled.

FIG. 11 is a diagram showing an example of the state rule delivered in the second exemplary embodiment.

First, policy converting means 108 acquires, based on the policy information stored in policy storing means 107, a constraint equation of a state rule related to the state variables that need to be satisfied to satisfy the requirements, from the state models in relation to the requirements, for the requirements in which the type of requirement is "security" among the requirements (enabled requirements) set as the policy. Here, the system state when the requirements are satisfied is defined as the requirements that need to satisfy the security requirements. In the case of the state models shown in FIG. 10, the right side of a conditional proposition logical expression can be extracted as a constraint equation of the state rule from the conditional proposition logical expression using the policy variables set as the "security requirements" in the policy information. Here, constraint equations g11 and g12 in FIG. 11 are extracted.

Furthermore, policy converting means 108 acquires, in a format of conditional proposition logical expression, a constraint equation related to the state variables that need to be satisfied if the requirements are satisfied, from the state models in relation to the requirements, for the requirements in which the type of requirement is "convenience" among the requirements (enabled requirements) set as the policy. Here, the system state that needs to be satisfied to satisfy the requirements is defined as the requirements that need to satisfy convenience requirements as much as possible. Policy variable y4 is used as a variable used for an objective function for delivering satisfaction of the requirements as an optimal solution. For example, in the case of the state models shown in FIG. 10, the conditional proposition logical expression registered as the state model associated with the policy variables set as the "convenience requirements" in the policy information can be extracted as a constraint equation. If only a constraint equation related to the state variables when the requirements are satisfied is registered as the state model, a conditional proposition logical expression using the policy variables on the left side and the constraint equation on the right side can be generated to deliver the expression as the constraint equation of the state rule. Here, constraint equation g13 in FIG. 11 is extracted.

Next, policy converting means 108 sets an objective function, in which the sum of the values of the policy variables is the maximum, and in which the policy variables are allocated to the convenience requirements as the requirements that need to be satisfied as much as possible among the requirements (enabled requirements) that are set as the policy and that need to be satisfied. For example, in the policy information shown in FIG. 9, among the requirements (enabled requirements) that are set as the policy and that need to be satisfied, the policy variable allocated to the requirement in which the type of requirement is "convenience" is y4. Therefore, objective function f11, which is maximize(y4) is set. If the requirements allocated with policy variable y5 are enabled, a conditional proposition logical expression using policy variable y5 is acquired in addition to the conditional proposition logical expression (constraint equation g13) using policy variable y4, and a objective function maximize (y4+y5) is set.

Policy converting means 108 can input the set of constraint equations and the objective functions into state changing means 101 as state rules.

State changing means 101 calculates a combination of the values of the variables that best satisfies the constraint equations and the objective functions inputted as the state rules by reducing it to the constraint optimization problem or by reducing it to the integer design problem. State changing means 101 searches to satisfy as many requirements as possible. In the example, policy converting means 108 inputs the state rules by setting the priority of the convenience requirements lower than that of the security requirements. As a result, the convenience requirements are satisfied only when the convenience requirements can be realized.

As described, according to the exemplary embodiment, the security manager can more easily realize the security operation management without the need to describe complicated state rules. Because, as the contents of the event definition, the action definition, and the state models corresponding to the requirements are common to a multiplicity of organizations, there is little necessity for the security manager to create the state models. In the exemplary embodiment, the security expert only needs to use the state models created in advance and that correspond to the requirements, and the security manager only needs to describe the policy information that indicates the effectiveness of the requirements.

Furthermore, the intention of the security manager can be more clearly reflected by designating not only the requirements related to security, but also the requirements related to convenience. In general, how strictly the security countermeasures will be carried out is determined in consideration of the trade-off between the associated advantage of the improvement in security and the disadvantage of the cost and the reduction in convenience. The requirements related to convenience vary depending on the usage of system, operational practice, and the like. Therefore, the requirements (overall requirements) for the security operation management can be more easily reflected in organizations by not only designating the requirements related to security, but also by individually designating the requirements related to convenience.

Furthermore, the over-constraint (nonexistence of the combination of solutions satisfying the constraint) tends to occur if the values of the policy variables are simply assigned to the state models to reduce it to a constraint problem. To prevent this, policy converting means 108 in the exemplary embodiment sets the priority order for each type of requirements to deliver the state rule. In the example illustrated above, the priority order of the requirements related to convenience is lowered below the requirements related to security to deliver the state rule. More specifically, the state rule is delivered as an objective function that takes the maximum value when the system is in the state of satisfying the requirements related to convenience. State changing means 101 searches to satisfy as many requirements as possible in accordance with the state rule delivered by policy converting means 108 based on the priority order. As a result, the state change for satisfying the convenience requirements according to the priority can be realized only when the security requirements can be realized. For example, a state change can be realized, in which the file sharing cannot be used when connected to the Internet (only the security requirements are satisfied, and the convenience requirements are not satisfied), but the file sharing can be used when connected to an intranet (both the security requirements and the convenience requirements are satisfied).

(Third Exemplary Embodiment)

Next, a third exemplary embodiment will be described.

Figure 12:
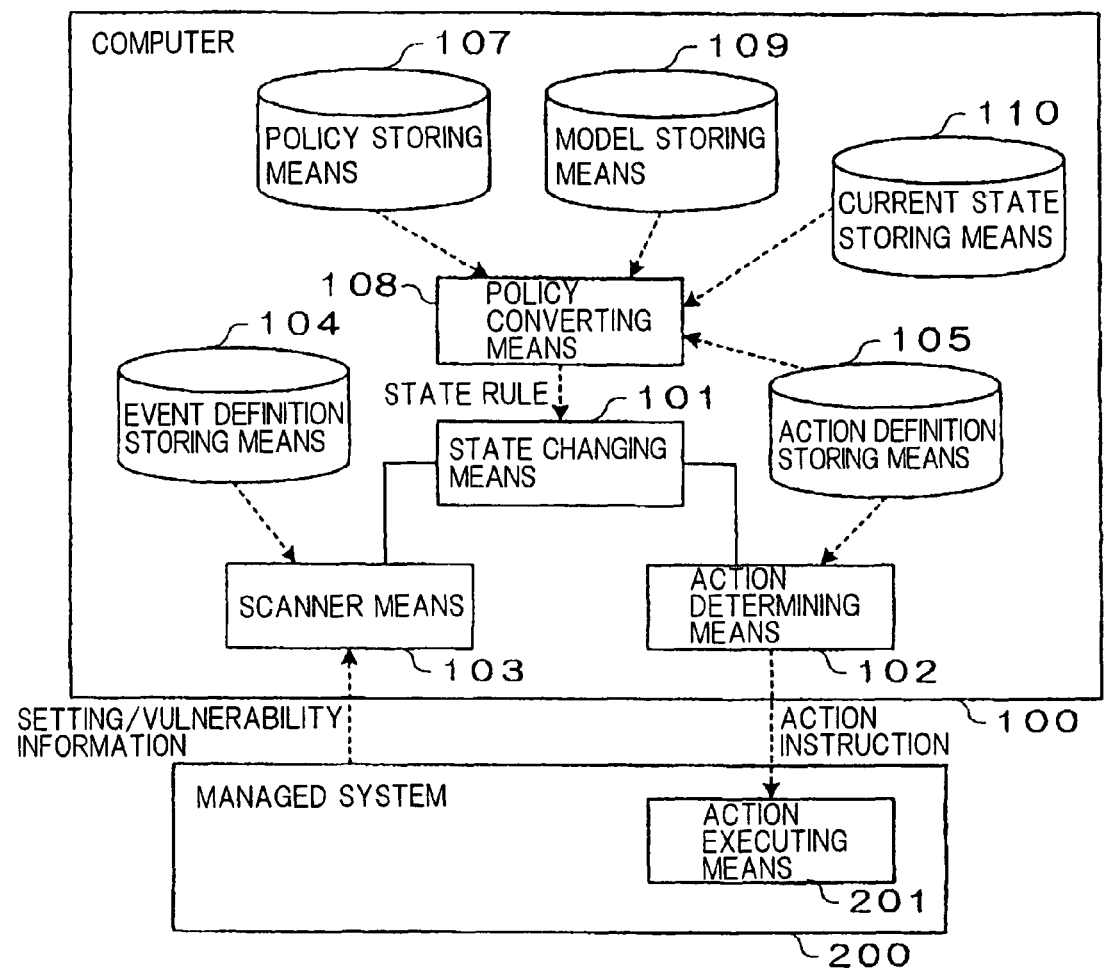
FIG. 12 is a block diagram showing a configuration example of the security operation management system according to a third exemplary embodiment.

FIG. 12 is a block diagram showing a configuration example of the security operation management system according to the third exemplary embodiment.

Compared to the second exemplary embodiment shown in FIG. 8, the security operation management system shown in FIG. 12 is different in that current state storing means 110 is included.

Current state storing means 110 holds the current system state (values of state variables) of managed system 200.

In the exemplary embodiment, policy converting means 108 delivers the state rule by considering the condition of change, which is indicated by the current system state before the reception of an event indicated by current state storing means 110 and the current system state after change indicated by the event, and by considering the difficulty in handling.

To deliver such a state rule by policy converting means 108, types indicating the executability of action are added for each action in the action definition stored by action definition storing means 105.

FIG. 13 is a diagram showing an example of the action definition stored in action definition storing means 105 in the third exemplary embodiment.

As shown in FIG. 13, the action definition includes type information indicating the executability of action for the actions associated with the state variables. FIG. 13 illustrates, for example, that an action associated with state variable x1 belongs to a type "automatic handling". FIG. 13 also illustrates that an action associated with state variable x2 belongs to a type "immediate handling difficult". FIG. 13 also illustrates that an action associated with state variable x3 belongs to a type "manual handling". Here, "automatic handling" denotes that the system can mechanically execute the action. Furthermore, "manual handling" denotes that the user of the system can immediately execute the action by manual operation. Furthermore, "immediate handling difficult" denotes an action that may not be immediately executed even by manual operation, and it takes time to execute the action. Other points are the same as in the second exemplary embodiment.

When the values of the event variables (set of values stored in the state variables indicating the current state of managed system 200) are inputted from scanner means 103, policy converting means 108 recognizes the condition of the state change of managed system 200 based on the values of the state variables indicating the current system state at the point before the reception of the event variables (system state before change) and the values of the state variables indicating the current system state indicated by the event variables (system state after change) stored in current state storing means 110. Specifically, policy converting means 108 obtains the values of the state variables after change indicating the current system state and what kind of changes have occurred to which state variables. After recognizing the conditions of the state changes, policy converting means 108 updates the values of the state variables indicating the current state of managed system 200 stored in current state storing means 110.

Next, a state rule delivery process executed by policy converting means 108 in the exemplary embodiment will be described. In the description here, the example shown in FIG. 13 is registered as the action definition, the example shown in FIG. 9 is registered as the policy information, and the example shown in FIG. 10 is registered as the state model. It is assumed that the enabling flag of policy variables set by the security manager is (Y1,Y2,Y3,Y4,Y5)=(1,1,0,1,0). FIG. 13 is an explanatory diagram showing an example of the state rule delivered in the example.

First, based on the policy information stored in policy storing means 107, policy converting means 108 acquires a constraint equation related to the state variables that need to be satisfied to satisfy the requirements, for the requirements in which the type of requirement is "security" (requirements that need to be satisfied) among the requirements (enabled requirements) set as the policy. Policy converting means 108 also acquires, in a format of a conditional proposition logical expression, a constraint equation related to the state variables that need to be satisfied to satisfy the requirements, from the state models related to the requirements in relation to the requirements in which the type of requirement is "convenience" (requirements that need to be satisfied as much as possible). The operation is the same as in the second exemplary embodiment. Here, constraint equations g21 to g23 in FIG. 14 are extracted.

Next, policy converting means 108 introduces new policy variable z1 that takes two kinds of values, 0 or 1, and generates a constraint equation that results in 1 when the values of the state variables changed in the current system state (values of the state variables changed compared to before the reception of the event variables) and the ultimate values of the state variables (values in the target state) are equal.

For example, it is assumed that the values of the state variables indicating the current system state shown by event variables are (x1,x2,x3,x4,x5)=(X1,X2,X3,X4,X5). X1 to X5 indicate values corresponding to state variables x1 to x5, respectively, and stored in the state variables as information indicating the current system state (here, after reception of event). In the example, X1 to X5 are integers that take two kinds of values, 0 or 1. At this point, if the inputted state change event is caused by, for example, a change in state variable x4 from scanner means 103, constraint equation g24, which is z1=(x4=X4), can be generated. This is an example of expressing whether policy variable z1 corresponding to a requirement "do not generate action that turns back the state change occurred immediately before as much as possible" is satisfied, by a constraint equation using state variables. The value of policy variable z1 is 1 when the requirement is satisfied and is 0 when the requirement is not satisfied. If the changed state variable takes more than two kinds of values, a constraint equation $z1=(x4 \neq X4')$ can be generated. X4' indicates a value stored in state variable x4 in the system state before the reception of the event variable.

Next, new policy variable z2 that takes two kinds of values, 0 or 1, is further introduced, and a constraint equation, which results in 1 if there is no change in the state variable that causes an action in which the type of action belongs to "immediate handling difficult", is generated. In the example shown in FIG. 13, the state variable that causes an action belonging to "immediate handling difficult" (thus, state variable associated with an item changed when the action belonging to "immediate handling difficult" is executed) is x2. Therefore, a constraint equation g25, which is z2=(x2=X2), can be generated. This is an example of expressing whether policy variable z2 corresponding to the requirement "prevent action in which immediate handling is difficult as much as possible" is satisfied, by a constraint equation using the state variables. The value of policy variable z2 is 1 when the requirement is satisfied and is 0 when the requirement is not satisfied. If there are two state variables x2 and x3 that cause an action belonging to "immediate handling difficult", a constraint equation $z2=((x2=X2) \wedge (x3=X3))$ can be generated.

Next, new policy variable z3 that takes two kinds of values, 0 or 1, is introduced, and a constraint equation, which results in 1 if all convenience requirements set by the security manager in the system state as the target state are satisfied, is generated. In the case of the policy information shown in FIG. 9, policy variables indicating the convenience requirements are y4 and y5, and the enabled requirement is y4. Therefore, a constraint equation g26, which is z3=(y4=1), can be generated. This is an example of expressing whether policy variable z3 corresponding to the requirement "satisfy all convenience requirements as much as possible" is satisfied, by a constraint equation using the state variables. The value of policy variable z3 is 1 when the requirement is satisfied and is 0 when the requirement is not satisfied. If there are two enabled convenience requirements y4 and y5, a constraint equation $z3=((y4=1) \wedge (y5=1))$ can be generated.

Next, new policy variable z4 that takes two kinds of values, 0 or 1, is further introduced, and a constraint equation, which results in 1 if there is no change in the state variable that causes an action in which the type of action belongs to "manual handling" when the current system state changes to the system state as the target state, is generated. In the example shown in FIG. 13, the state variable that causes an action belonging to "manual handling" (thus, state variable associated with an item changed when the action belonging to "manual handling" is executed) is x3. Therefore, constraint equation g27, which is z4=(x3=X3), can be generated. This is an example expressing whether policy variable z4 corresponding to the requirement "prevent action involving manpower as much as possible" is satisfied, by a constraint equation using the state variables. The value of policy variable z4 is 1 when the requirement is satisfied and is 0 when the requirement is not satisfied. If there are two state variables x2 and x3 that cause an action belonging to "manual handling", a constraint equation $z4=((x2=X2) \wedge (x3=X3))$ can be generated.

Next, new policy variable z5 that takes values from 0 to the number of state variables (5 here) is introduced, and a constraint equation, which becomes larger when the values of the state variables in the current system state and the values of the state variables in the system state as the target state are closer, is generated. If there are five state variables x1 to x5, constraint equation g28 z5=(x1=X1)+(x2=X2)+(x3=X3)+(x4=X4)+(x5=X5) can be generated. This is an example of expressing how much policy variable z5 corresponding to the requirement "decrease actions to be carried out as much as possible" is satisfied, by a constraint equation using state variables. The value of policy variable z5 is the number of state variables (5 here) when the requirement is most satisfied and is 0 when the requirement is least satisfied.

Lastly, an objective function is set, in which the sum of the values of the policy variables (here, z1 to z5) allocated to the requirements that need to be satisfied as much as possible is the maximum. Here, an objective function is generated to satisfy as many as possible of the conditions z1 to z4 as many as possible with the priority order of z1>z2>z3>z4>z5 while making the value of z5 large. The objective function indicates a state "avoid actions that turn back the state change that occurred immediately before as much as possible, avoid actions in which immediate handling is difficult as much as possible, do not decrease the convenience as much as possible, avoid actions involving manpower as much as possible, and reduce actions to be executed as much as possible" is the target state. For example, z1 to z5 may be weighted by values greater than the value that z5 can take and by greater values for higher priority to set an objective function in which the sum of the values is the maximum. In the example shown in FIG. 14, objective function f21, maximize($z5+5 \cdot z4+10 \cdot z3+20 \cdot z2+40 \cdot z1$), is set. Making the values of weighting $z2$ or $z4$ larger than the value of weighting $z5$ means that when the same number of actions is executed, the amount of change corresponding to the difference in the objective function is estimated larger if diagnostic items, for which actions are easier to execute, are changed.

Policy converting means 108 can input the set of the constraint equations and the objective functions into state changing means 101 as state rules. In the exemplary embodiment, every time an event (value of new state variable) is received from scanner means 103, policy converting means 108 can generate a state rule, and state changing means 101 can make a state change based on the state rule. After generating the state rule, policy converting means 108 updates the current state of managed system 200 stored in current state storing means 110 to the values of the state variables indicated by the received events to again measure the degree of state change in the reception of the next event.

As described, according to the exemplary embodiment, constraint equations and objective functions, in which state variables serving as state rules and indicating the target state are used, are delivered taking into consideration not only the type of requirements, but also the effectiveness of actions based on the current system state. Therefore, the change in the state can be followed to maintain the system security with a minimum state change. Furthermore, situations, such as the system being left unsecured for a long time and troubling the user of the system to obstruct the operation, can be prevented. Because, state rules are delivered, the state rules including objects "do not generate actions that turn back the state change that occurred immediately before as much as possible", "reduce actions to be executed as much as possible", "prevent actions in which immediate handling is difficult as much as possible", and "prevent actions involving manpower as much as possible".

FIG. 15 is a diagram showing an example of the state change in the third exemplary embodiment.

Example 1 and example 2 in FIG. 15 illustrate an example, in which although the same event ($X3=0$, change to [disabling antivirus tool]) is detected, the handling method differs depending on the difference in the current system state.

Example 1 is an example when the antivirus tool is disabled in a state of being connected to the Internet ($X2=1$). The current system state including other state variables is ($X1,X2,X3,X4,X5$)=(1,1,1,0,0). In this case, state change st11 for taking a handling method (action) of cutting off the network (switch to $x1=0$) and state change st12 for taking a handling method of reconnecting to the intranet (switch to $x2=0$) satisfy constraint equations g21 and g22 included in the state rules shown in FIG. 14. Here, immediate handling of the handling method of reconnecting to the intranet (change to $x2=0$) is difficult, and the problem is large in terms of security. Therefore, in the exemplary embodiment, although the convenience is reduced, ($x1,x2,x3,x4,x5$)=(0,1,0,0,0) is set as the target state to perform state change st12 for taking the handling method of cutting off the network (change to $x1=0$).

Example 2 is an example when the antivirus tool is disabled in a state of being connected to the intranet ($X2=0$). The current system state including other state variables is ($X1,X2,X3,X4,X5$)=(1,0,1,0,0). In this case, state change st21 for taking a handling method of enabling the firewall (switch to $x5=1$) and state change st22 for taking a handling method of cutting off the network (switch to $x1=0$) satisfy constraint equations g21 and g22 included in the state rules shown in FIG. 14. Here, the handling method of enabling the firewall can be automatically handled, and the convenience is not reduced. Therefore, in the exemplary embodiment, a target state ($x1,x2,x3,x4,x5$)=(1,0,0,0,1) is set to perform state change st21 for taking the handling method of enabling the firewall (switch to $x5=1$).

As described, in the exemplary embodiment, an optimal security countermeasure can be carried out in consideration of the executability of the countermeasure and the reduction in convenience. The priority order of the items needs not be as described above. The priority order may also be able to be described as a policy.

(Fourth Exemplary Embodiment)

Next a fourth exemplary embodiment will be described.

Figure 16:
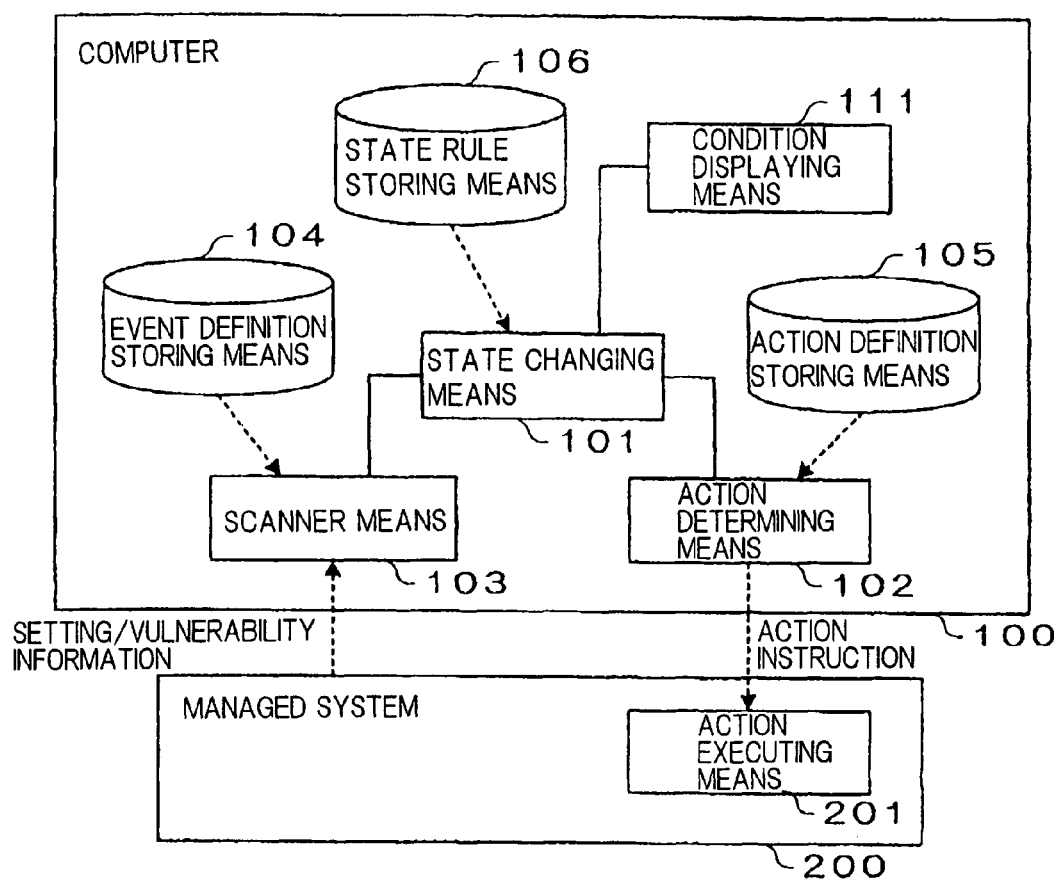
FIG. 16 is a block diagram showing a configuration example of the security operation management system according to a fourth exemplary embodiment.

FIG. 16 is a block diagram showing a configuration example of the security operation management system according to the fourth exemplary embodiment.

Compared to the first exemplary embodiment shown in FIG. 3, the security operation management system shown in FIG. 16 is different in that condition displaying means 111 is included.

Condition displaying means 111 displays to the security manager whether managed system 200 satisfies the state rule. Here, condition displaying means 111 may display it not only to the security manager of managed system 200, but also to the user of managed system 200. This can directly remind the user of managed system 200 of forgetting of the execution of action.

Next, an operation of the exemplary embodiment will be described.

Figure 17:
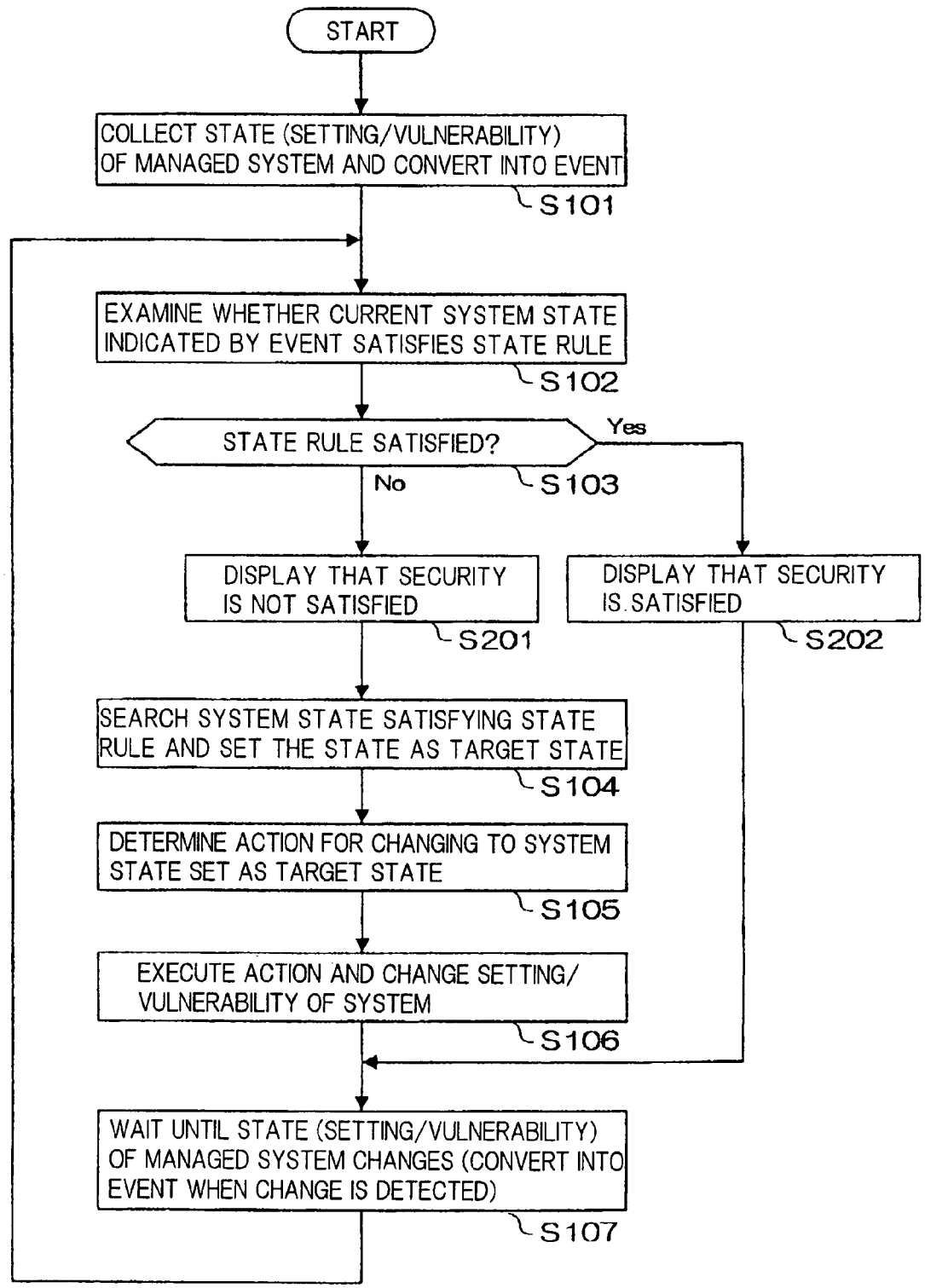
FIG. 17 is a flow chart showing an operation example of the fourth exemplary embodiment.

FIG. 17 is a flow chart showing an operation example of the fourth exemplary embodiment. In FIG. 17, the same operations as in the first exemplary embodiment shown in FIG. 4 are designated with the same step numbers, and the description will not be repeated.

As a result of the examination by state changing means 101, if the state rule is satisfied in step S103, condition displaying means 111 displays, to the security manager, that the security is satisfied in step S202. Condition displaying means 111 may, for example, receive a notification from state changing means 101 to display, on a predetermined display device included in the security operation management system, a status screen indicating the current system state shown by the state variables and indicating that the security is satisfied.

On the other hand, if the state rule is not satisfied in step S103, condition displaying means 111 displays, to the security manager, that the security is not satisfied in step S201. Condition displaying means 111 may, for example, receive a notification from state changing means 101 to display, on a predetermined display device included in the security operation management system, a status screen indicating the current system state shown by the state variables and indicating that the security is not satisfied. To display the status screen to the user of managed system 200, for example, the status screen may be displayed on a predetermined display device included in managed system 200. Furthermore, for example, the status screen may be displayed on managed system 200 by transmitting, to managed system 200, a message to be displayed on the screen by managed system 200 that has received it.

Although the exemplary embodiment has illustrated an example of adding condition displaying means 111 to the configuration of the first exemplary embodiment, the same application is also possible for the second exemplary embodiment and the third exemplary embodiment.

As described, according to the exemplary embodiment, displaying whether the current system state is in the state as defined by the state rule allows the security manager and the user of managed system 200 to recognize the security state of the system in real time. This is particularly effective when there is no means for mechanically changing the incident recognized as setting or vulnerability, and a warning is just displayed to the user as an action. Because, the security manager and the user can check whether the user has actually performed the countermeasure as warned, forgetting to perform the countermeasure can be prevented.

(Fifth Exemplary Embodiment)

Next, a fifth exemplary embodiment will be described. In the first to fourth exemplary embodiments, a constraint satisfaction problem and a constraint optimization problem have been solved upon the event reception. Therefore, there is a problem that it may take time to execute an action after the event reception if the model and the policy are complicated. The present exemplary embodiment solves the problem.

Figure 18:
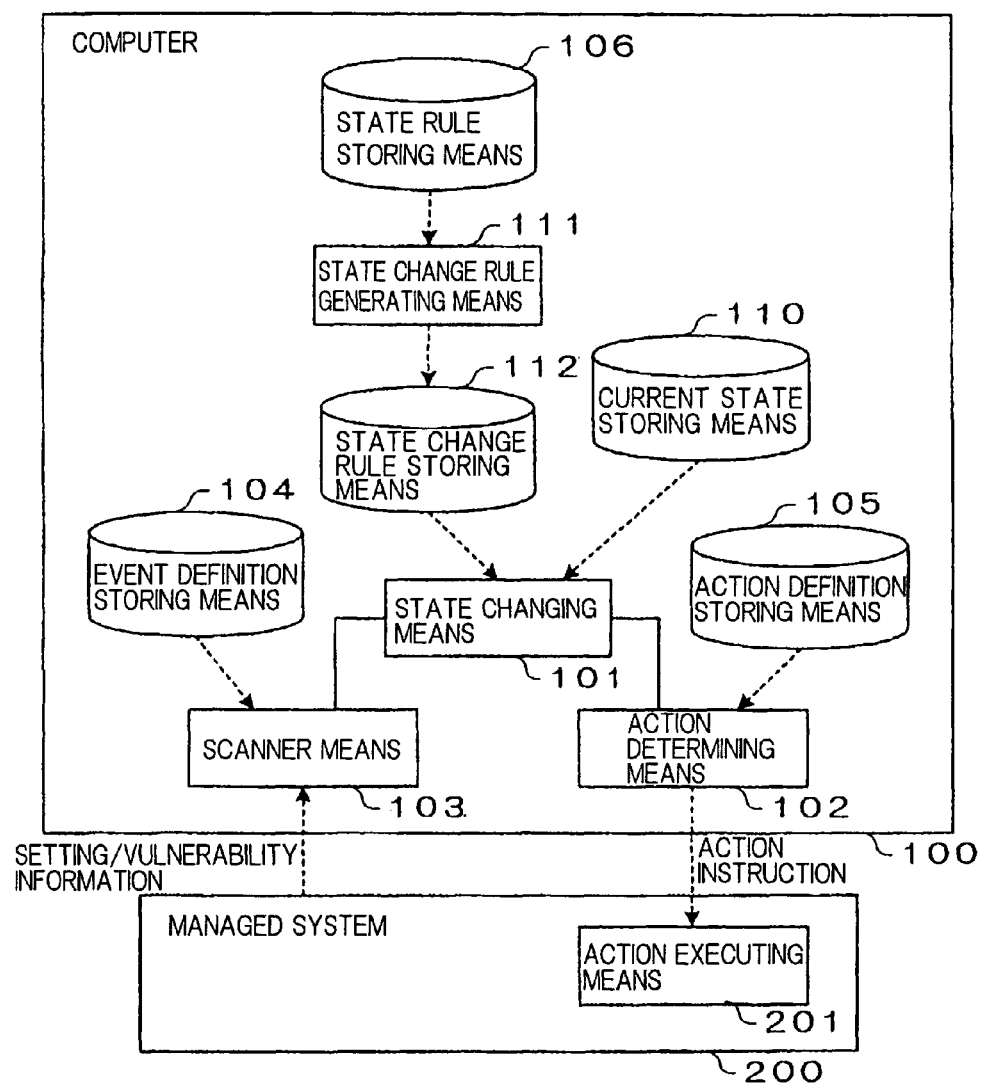
FIG. 18 is a block diagram showing a configuration example of the security operation management system according to a fifth exemplary embodiment.

FIG. 18 is a block diagram showing a configuration example of the security operation management system according to the fifth exemplary embodiment.

Figure 1A:
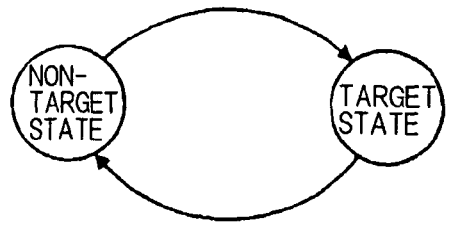
FIG. 1a is a diagram showing a relationship between the number of states and the number of state changes.
Figure 1B:
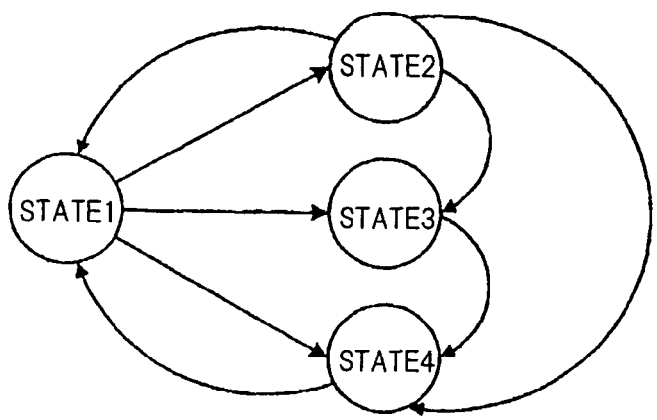
FIG. 1b is a diagram showing a relationship between the number of states and the number of state changes.

Compared to the first exemplary embodiment shown in FIG. 1, the security operation management system shown in FIG. 18 is different in that current state storing means 110, state change rule generating means 111, and state change rule storing means 112 are included.

Current state storing means 110 holds the current system state (values of state variables) of managed system 200 as in the third exemplary embodiment. The third exemplary embodiment has illustrated an example in which policy converting means 108 updates the values of the status variables indicating the current state of managed system 200 stored in current state storing means 110. In the present exemplary embodiment, the values can be updated after state changing means 101 recognizes the condition of the state change of managed system 200.

Based on the state rule stored in state rule storing means 106, state change rule generating means 111 delivers in advance what state change can be made and stores it in state change rule storing means 112 as a state change rule.

State change rule storing means 112 stores the state change rule generated by state change rule generating means 111. The state change rule defines a state after change when a state variable is changed in a state that the monitored system can take. The delivered state change rule is generated and stored as a set of information in which a certain state of the monitored system is set as a state before change, and information, which indicates state variables that may be changed in the state and the values after change, and information, which indicates the state after change, are associated.

State changing means 101 in the exemplary embodiment performs a state change in accordance with the state change rule stored in state change rule storing means 112. More specifically, based on the values of the state variables that are stored in current state storing means 110 and that indicate the current system state (system state before change) at the time before the reception of the event variables and the values of the state variables indicating the current system state (system state after change) indicated by the event variables inputted from scanner means 103, state changing means 101 recognizes the condition of the state change of managed system 200 and then performs the state change in accordance with the state change rule defined for the state change.

Next, a generation process of the state change rule of state change rule generating means 111 will be described.

FIG. 19 is a diagram using a pseudo code to show an algorithm of the generation process of the state change rule of state change rule generating means 111 shown in FIG. 18.

Here, terms and signs will be defined for description. Hereinafter, "combination of values of state variables" will be simply called "state". A value of n-th state variable of certain state S will be described as S(n). A range (set of values that can be taken) of n-th state variable of state S will be described as d(n). A state in which a value of n-th variable of state S is changed to a is described as S[n:a]. By the way, a∈d(n). Furthermore, a state change in which the value of n-th variable of certain state S changes to a to make a transition to another state T will be described as δ(S,T,n:a). A function closest(X,Y) in FIG. 19 is a function for returning an element closest to state Y (state Xj including most state variables in which Xj(i)=Y(i) (i=1 to N)) from set X of states. Furthermore, generate δ is a command for generating a constraint equation (one state change rule) defining state change δ.

State change rule generating means 111 first lists states not satisfying the state rule. A set of the states listed here will be called TNS. Next, for all states S included in set TNS (line 01 of FIG. 19), sequentially from the first state variable of the state to N-th state variable (line 02), when the values of the state variables are changed to values other than current values S(n) (line 03), if states S[n:a] after change are not included in set TNS (line 06), states T that are T(n)=S(n) are extracted from a complementary set of set TNS, and set X is assigned (line 07). Here, set X is a set of states satisfying the state rule among the states that change to state S by changing n-th state variable from a to S(n).

Here, if X is an empty set (line 08), it means that there is no state satisfying the state rule among the states that change to state S by changing n-th state variable from a to S(n). Therefore, the state variable cannot be changed from a to S(n) from state S[n:a]. Therefore, a state change rule defining state change δ (S[n:a],S[n:a],n:S(n)) for returning to state S[n:a] is generated (line 09).

On the other hand, if X is not an empty set (line 10), an element closest to state S[n:a] (state Xj including most state variables in which Xj(i)=S[n:a](i) (i=1 to N)) from set X is set as P (line 11), and a state change rule, which defines change δ (S[n:a],P,n:S(n)), in which the state after change when n-th state variable is changed to S(n) from state S[n:a] is state P, is generated (line 12).

Next, an operation of state changing means 101 in the exemplary embodiment will be described. In the exemplary embodiment, state changing means 101 searches the state change rule stored in state change rule storing means 112, in which the current state stored in current state storing means 110 (state of the monitored system that computer 100 currently recognizes, in other words, state of the monitored system before the reception of event) and the event notified from scanner means 103 are the keys. If a matching state change rule exists, state changing means 101 determines the state after change (target state) in accordance with the state change rule and causes action determining means 102 to determine an action necessary to change the current state after notification to the state after change. Action determining means 102 can, for example, search an action necessary to change the state variable, which is different between being in the current state after notification and being in the target state, to the value in the target state, from the action definition stored in action definition storing means 105.

If there is no matching state change rule, state changing means 101 determines that the current state after notification satisfies the state rule and does not notify anything to action determining means 102.

As described, according to the exemplary embodiment, state change rule generating means 111 generates the state change rule when the state rule is designated. This can significantly speed up the process for events occasionally notified during operation of the managed system, compared to the second exemplary embodiment. As a result, it is advantageous in that finishing of the execution time of state changing means 101 within a certain time for searching the state change rule can be ensured and that the execution of the action in real time after the reception of event can be ensured.

Although the exemplary embodiment has illustrated an example of generating a state change rule defining the state with smallest state change among the states satisfying the state rule as the state after change (thus, target state), state change rule generating means 111 can also, for example, generate a state change rule defining all states satisfying the state rule as the target state. In such a case, state changing means 101 can determine one of the states as the target state based on the current state, the condition of the change, and so forth.

(Sixth Exemplary Embodiment)

Next, a sixth exemplary embodiment will be described.

Figure 20:
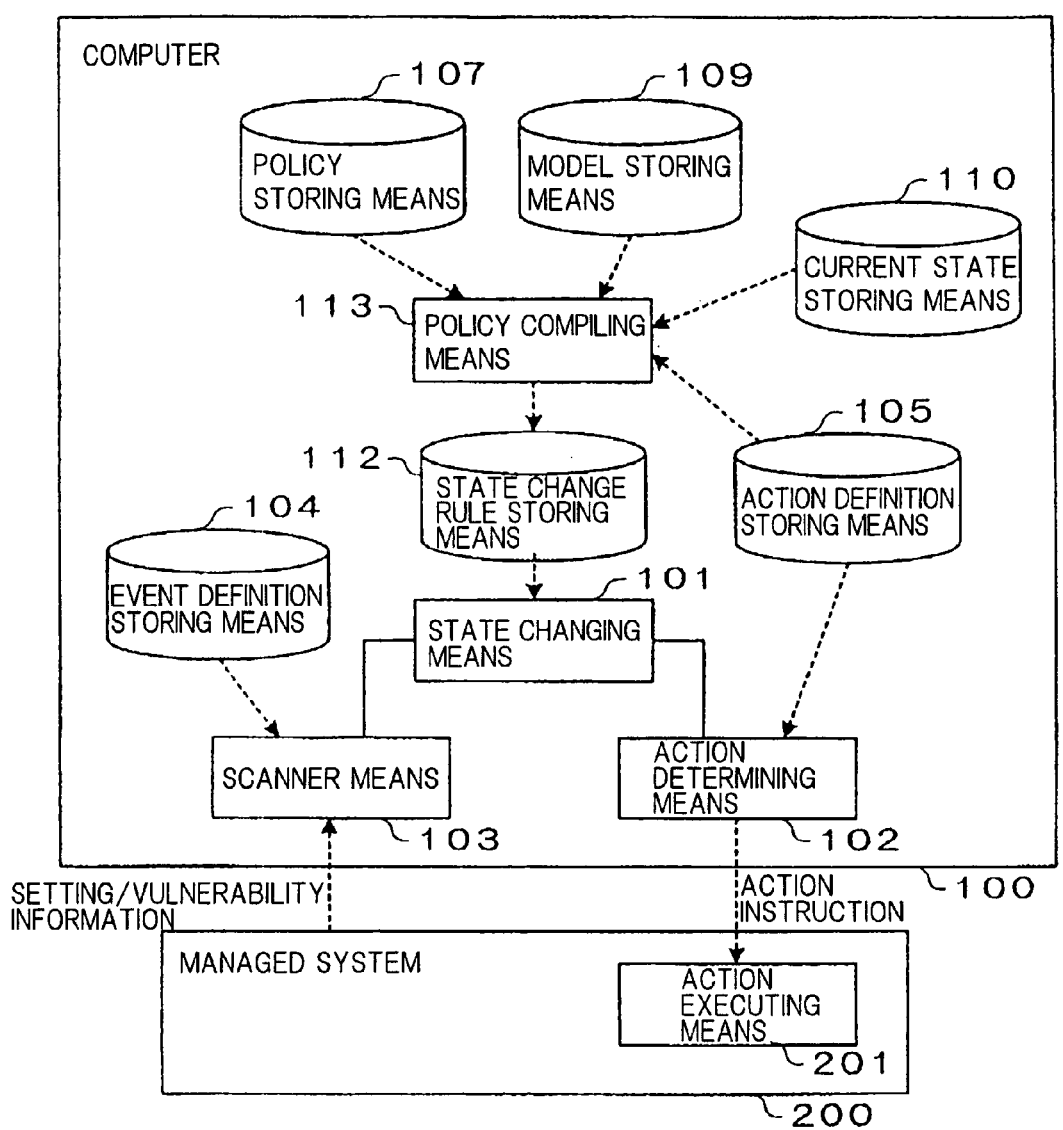
FIG. 20 is a block diagram showing a configuration example of the security operation management system according to a sixth exemplary embodiment.

FIG. 20 is a block diagram showing a configuration example of the security operation management system according to the sixth exemplary embodiment.

Compared to the third exemplary embodiment shown in FIG. 12, the security operation management system shown in FIG. 20 is different in that policy compiling means 113 replaces policy converting means 107, and state change rule storing means 112 is further included.

Policy compiling means 113 considers the condition of change and the difficulty of handling indicated by the current system state before the reception of the event indicated by current state storing means 110 and the current system state after change indicated by the event to deliver in advance what kind of state change needs to be made and stores it in state change rule storing means 112 as a state change rule.

State changing means 101 in the exemplary embodiment performs the state change in accordance with the state change rule stored in state change rule storing means 112. This is the same as in the fifth exemplary embodiment.

Next, a generation process of the state change rule of policy compiling means 113 will be described.

Figure 21:
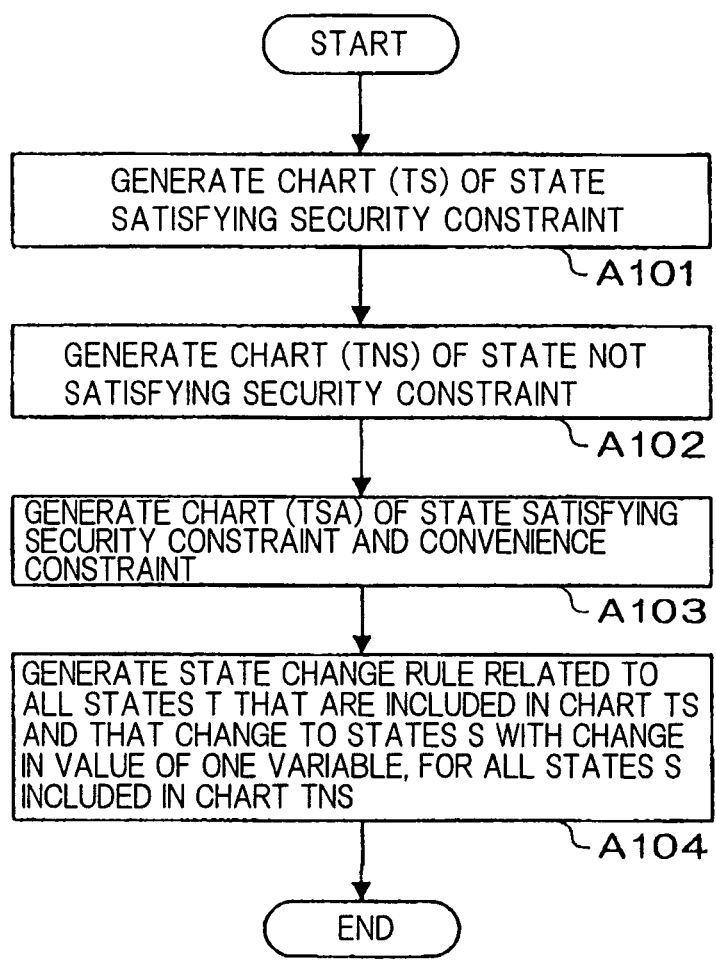
FIG. 21 is a flow chart showing an example of a generation process of state change rules of policy compiling means shown in FIG. 20.

FIG. 21 is a flow chart showing an example of the generation process of the state change rule of policy compiling means 113 shown in FIG. 20.

As shown in FIG. 21, in step A101, policy compiling means 113 first lists states satisfying the constraint equation (thus, security constraint) based on the constraint equation related to the state variables that need to be satisfied to satisfy the requirements in which the type of requirement is "security" (requirements that need to be satisfied) among the requirements set as the policy (enabled requirements). Hereinafter, a chart (set) generated by the state listing will be called TS. In step A102, policy compiling means 113 lists the states not satisfying the constraint equation (security constraint). Hereinafter, a chart (set) generated by the state listing will be called TNS. Furthermore, in step A103, policy compiling means 113 lists the states satisfying the constraint equation (thus, security requirements and convenience requirements) based on the constraint equation related to the state variables that need to be satisfied to satisfy the requirements in which the type of requirement is "convenience". Hereinafter, a chart (set) generated by the state listing will be called TSA.

In step A104, policy compiling means 113 delivers (generates) a state change rule for all states included in set TNS based on an algorithm shown in FIG. 21.

FIG. 22 is an explanatory diagram using a pseudo code to show the algorithm of the generation process of the state change rule by policy compiling means 113 shown in FIG. 20. By the way, type(n) in FIG. 22 denotes a function for returning "type" of n-th state variable (see FIG. 9).

More specifically, policy compiling means 113 delivers a state change rule defining the state changes for all states S included in set TNS and for all states T that are included in set TS and that change to states S by a change of a value of one variable.

Next, the flow chart of FIG. 21 and the algorithm of FIG. 22 will be described with a specific example. Here, it is assumed that the policy information shown in FIG. 9, the state model shown in FIG. 23, and the action definition shown in FIG. 13 are set. It is also assumed that the enabling flag of policy variables set by the security manager is (Y1,Y2,Y3,Y4,Y5)= (1,1,0,1,0). The state models shown in FIG. 23 show an example in which the requirements defined as policy variable y4 in the example of state models shown in FIG. 10 already described are changed to a form closer to the actual setting example. FIG. 23 shows state models for the requirements allocated with policy variable y4, indicating that the following constraint equation needs to be satisfied to satisfy the requirements shown by policy variable y4. This indicates that, to use file sharing, connection to the network needs to be made, and file sharing needs to be enabled.

$$(x1=1) \land (x4=1)$$

First, policy compiling means 113 delivers, from FIG. 23, the following constraint equation as a constraint equation satisfying policies Y1 and Y2 as security requirements.

$$((x1=0) \lor ((x2=0) \land ((x3=1) \lor (x5=1))) \lor ((x2=1) \\ \land (x3=1))) \land ((x=0) \lor (x2=0) \lor ((x2=1) \\ \land ((x4=0) \lor (x5=1))))$$

Figures 24B, 25A:
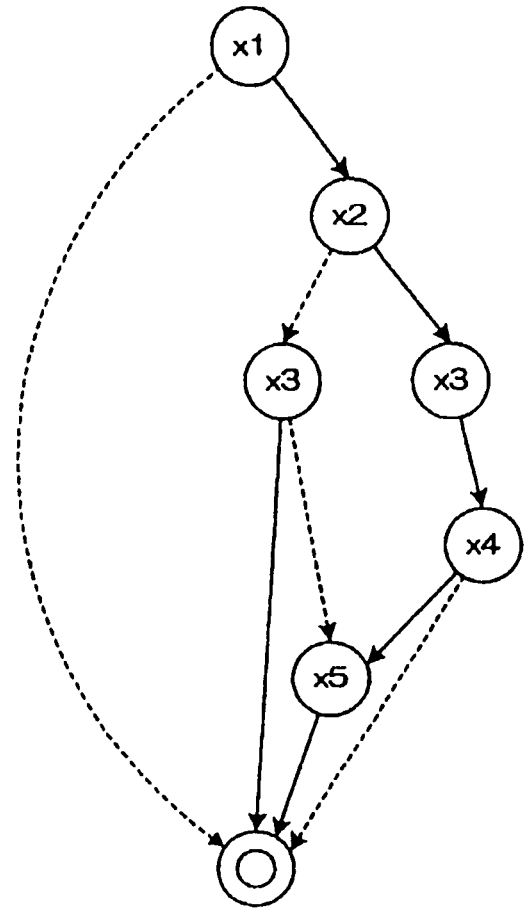
FIG. 24b is a diagram showing an example of state set TS satisfying the security requirements.
FIG. 25a is an explanatory diagram showing an example of state set TNS not satisfying security requirements.
Figures 25B, 26A:
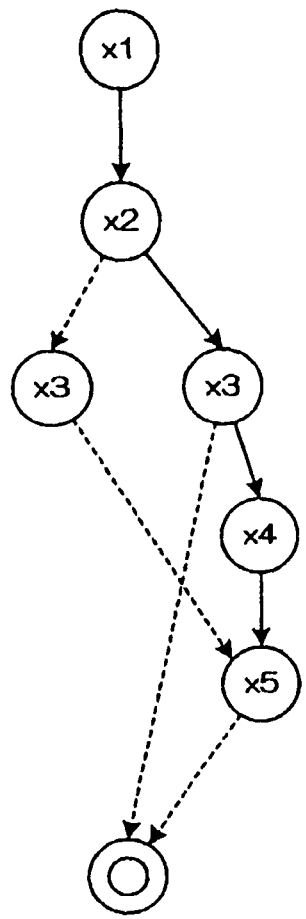
FIG. 25b is an explanatory diagram showing an example of state set TNS not satisfying the security requirements.
FIG. 26a is a diagram showing an example of state set TSA satisfying security requirements and convenience requirements.

An example of state set TS satisfying the constraint equation is illustrated in FIG. 24a and FIG. 24b. An example of state set TNS not satisfying the constraint equation is illustrated in FIG. 25a and FIG. 25b.

As shown in FIG. 24a and FIG. 25a, if a combination of variables is held in a format of a simple chart, enormous storage capacity is necessary in terms of index function if the number of variables increases. However, if the combination is held in a data structure as shown in FIG. 24b and FIG. 25b, the storage capacity can be significantly reduced in many cases. The data structure is called BDD (Binary Decision Diagram) when the values of variables are binary. In the illustrated BDD, a broken line indicates that the value of a node is 0. A solid line indicates that the value of a node is 1. A path from a node of x1 (start node) to a node indicated by a double circle denotes a combination of permitted variables. For example, information indicating the paths from the start node to the end node (information of nodes as passing points of the path and type information of the line connecting the nodes) may be held as the information of the established BDD. The information can be shown by a similar data structure (finite automaton) even if the values of the variables have three or more values. Alternatively, since variables with three or more values can be replaced by a plurality of binary variables, the information can be shown by BDD after the replacement. For example, if variable y indicating values 0 to 3 is defined as $(y=0) \Leftrightarrow (x1=0 \land x2=0)$, $(y=1) \Leftrightarrow (x1=0 \land x2=1)$, $(y=2) \Leftrightarrow (x1=1 \land x2=0)$, and $(y=3) \Leftrightarrow (x1=1 \land x2=1)$, a replacement to two binary variables x1 and x2 can be made. Therefore, for example, a constraint $(y=2) \lor (x=1)$ can be replaced by a constraint $(x1=1 \land x2=0) \lor (x=1)$ to show the information by BDD.

In FIG. 24b, for example, a broken line is connected to a node shown by a double circle (hereinafter, called end node) from a node of x1. This indicates that when x1=0, all combinations of the values of the subsequent nodes are permitted and is synonymous with listing of the state indicated by σ0 to σ15 in FIG. 24a. Furthermore, for example, in a path x1 (solid line)→x2 (solid line)→x3, a line from the node of x3 is a solid line, indicating that only x3=1 is permitted when x1=1 and x2=1. After that, a path x3 (solid line)→x4 (broken line)→end node and a path x3 (solid line)→x4 (solid line)→x5 (solid line)→end node can be taken. This corresponds to the states indicated by σ28, σ29, and σ31 in FIG. 24a. The numeric values following σ indicating an identifier of each state are allocated with decimal notations of numeric values expressing combinations of values of x1 to x5 by binary numbers. For example, it can be recognized that σ28 is an identifier allocated to the state (x1,x2,x3,x4,x5)=(1,1,1,0,0).

Policy compiling means 113 acquires the constraint equation in which the type of requirement is "convenience" (constraint equation defined for policy variable y4 in the example shown in FIG. 23a and FIG. 23b) and lists the states satisfying the security requirements in addition to the convenience requirements to deliver set TSA.

In the example, in addition to the constraint equation shown above, states satisfying the constraint equation for satisfying the convenience requirements (($x1=1$)∧($x4=1$)) are listed to deliver set TSA.

Figures 26B, 27:
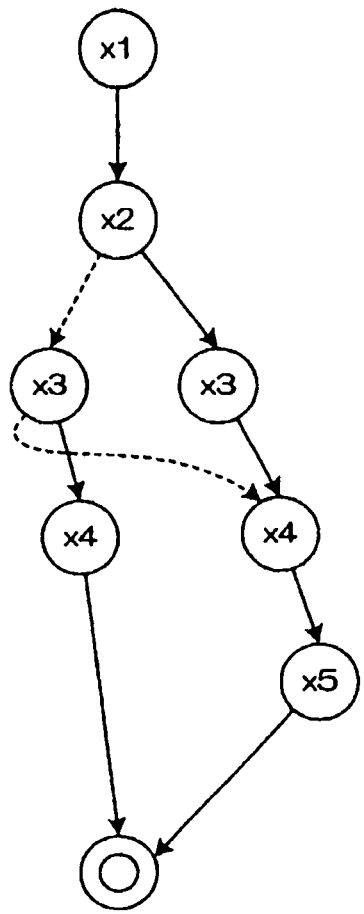
FIG. 26b is a diagram showing an example of state set TSA satisfying the security requirements and the convenience requirements.
FIG. 27 is a diagram showing an example of generated state change rules.

FIG. 26a and FIG. 26b are diagrams showing an example of delivered set TSA.

As shown in FIG. 26a and FIG. 26b, set TSA in the example is obtained by extracting the state of x=1 and x4=1 from set TS shown in FIG. 24a and FIG. 24b.

Next, an algorithm of FIG. 22 as an example of the delivery process of the state change rule in step A104 of FIG. 21 will be described.

First, one state is selected from TNS, which is a set of states not satisfying the security requirements, and S is assigned to the state (line 01 of FIG. 22). Here, S=σ24 is set. By the way, σ24 is a state of (x1,x2,x3,x4,x5)=(1,1,0,0,0). Then, the following process is executed for state S, in sequence from the first state variable (line 02). First, one state, in which the value of a state variable to be processed (here, first state variable x1 where n=1) is changed, is selected and the S[n:a] is assigned to the state (line 03). In the example, since the state variables are binary, there is only one state S[n:a]. State S[n:a] in which the value of state variable x1 in state S=σ24 is changed is S[1:0]=σ8 in which a=0.

When state S[n:a] is set, the following process is executed based on state S[n:a]. First, whether state S[n:a] is included in state set TNS is examined (line 04).

If state S[n:a] (here, σ8) is included in set TNS, a state change rule for state S[n:a] is not generated (line 05). This is because a state change from state S[n:a] (σ8), which is prohibited for security reason, to state S(σ24), which is prohibited for security reason, does not occur. Therefore, the process returns to line 03, and if there is another state in which the value of the state variable to be processed is changed in state S, the process switches to scanning with the value. If there is no other relevant state in line 03, the process returns to line 02, and a switch to a process for processing the next state variable (n=2) is made. If there is no next state variable in line 02, in other words, if processing of all state variables is completed, the process returns to line 01, and a switch to a process for processing the next state (state S) from set TNS is made.

On the other hand, if state S[n:a] (here, σ8) is not included in set TNS (line 06), a state, in which the value of the first state variable is 1 (value before change), is extracted from state set TS, and set X is generated (line 07). In the example shown in FIG. 25a and FIG. 25b, σ8 is not included in set TNS. Therefore, the process moves to line 07, and set X, in which the value of the first state variable is S(n) in TS, which is a set of the states satisfying security requirements, in other words, states where x1=1, is generated. The set X may also be indicated not by a table form, but by a format of BDD (or finite automaton).

Here, if X is an empty set (line 08), when the value of state variable n is changed from a to S(n) in state S[n:a] permitted in terms of security, a state change rule defining state change δ(S[n:a],S[n:a],n:S(n)) indicative of returning again to state S[n:a] is generated (line 09). This is because the fact that X is an empty set means that state S[n:a] (here, σ8) permitted in terms of security cannot be changed to a state permitted in terms of security, while the value of n-th state variable is being changed from a (here, x1=0) to S(n).

If state S is σ24, X={σ17,σ19,σ20,σ21,σ22,σ23,σ28,σ29,σ31}. Since X is not an empty set, the process proceeds to line 11.

If X is not an empty set (line 11), states, in which the state variable in which immediate execution is difficult is not changed from state S, are extracted from set X, and set Y is generated. In the example, the state variable, in which the immediate execution is difficult, is x2 from FIG. 13. Therefore, states with state variable x2=S(2)=1 are extracted from set X, and Y={σ28,σ29,σ31} is set.

Here, if Y is an empty set (line 12), there is no state that can be switched to state S without changing a state variable in which the immediate execution is difficult. Therefore, satisfying the constraint is given up, and Y is assigned to set X. Thus, Y=X is set (line 13).

Next, whether S[n:a] is included in TSA, which is a set of states satisfying the security requirements and the convenience requirements, is determined (line 15).

If S[n:a] is included in set TSA, product set Z of Y and TSA is calculated (line 16). The process is a process for satisfying an availability constraint (convenience requirements) in the state after change as much as possible if the state before change satisfies the availability constraint. In the example, since S[1:0] is not included in set TSA, the process proceeds to line 17.

If S[n:a] is not included in set TSA (line 17), satisfying the constraint is given up, and Z is assigned to set Y. Thus, Z=Y is set (line 18).

The processes of lines 19 and 20 are processes for assigning Y to set Z if set Z is empty as a result of calculation of product set Z in line 16.

Next, states, in which the state variable of manual handling is not changed from state S, are extracted from set Z, and set W is generated (line 23). In the example, the state variable of manual handling is x3 from FIG. 13. Therefore, as a result of extracting states with state variable x3=S(3)=0 from set Z, W=φ (empty set) is set.

Here, if set W is an empty set (line 25), there is no state that can be moved to state S without changing the state variable of manual handling. Therefore, satisfying the constraint is given up, and W is assigned to set Z. Thus, W=Z is reset (line 26).

Next, a state closest to state S[n:a] (state with the least number of different state variables) is selected from set W, and state P is set (line 28). In the example, state σ28 is selected as the state closest to S[1:0]=σ8=(0,1,0,0,0) from set W={σ28,σ29,σ31}={(1,1,1,0,0),(1,1,1,0,1),(1,1,1,1,1,)}. Since state σ28=(1,1,1,0,0) can be set to S[1:0] with a change of two state variable (x1 and x3), the state is closest to S[1:0] in set W. Here, P=σ28=(1,1,1,0,0) is set.

Lastly, a state change rule is generated using selected state P (line 29). More specifically, a state change rule defining state change δ(S[n:a],P,n:S(n)) for switching to state P when an event, state variable n←S(n), is received in state S[n:a] is generated. In the example, a state change rule defining a state change for not switching to state S=σ24=(1,1,0,0,0), but for switching to state P=σ28=(1,1,1,0,0) when an event x1←1 is received in state S[n:a]=σ8=(0,1,0,0,0) is generated. The foregoing is the state change rule generation process for state S[n:a] with a certain change value of a selected state variable when a certain state variable is set as a processing target in a certain state S.

A state change rule for preventing a state change to a state not satisfying the security constraint can be generated by applying the process to other change values that a state variable as a processing target can take, all state variables of state S, and all states S included in set TNS (state set that does not satisfy the security requirements).

FIG. 27 is a diagram showing an example of a generated state change rule.

The content shown in FIG. 27 is stored in state change rule storing means 112. FIG. 27 defines a state change of not switching to state σ16=(1,0,0,0,0), but to state σ17=(1,0,0,0,1) when, for example, an event x1←1 is received in state σ0=(0,0,0,0,0).

Next, an operation of state changing means 101 in the exemplary embodiment will be described.

State changing means 101 searches a state change rule stored in state change rule storing means 112, in which the current state stored in current state storing means 110 (state of monitored system before an event is notified) and an event notified from scanner means are the keys. If there is a matching state change rule, state changing means 101 determines a state after change (target state) in accordance with the state change rule and causes action determining means 102 to determine an action necessary to change the current state after notification to the target state. Action determining means 102 can, for example, search state variables that are different between being in the current state after notification and being in the target state and actions necessary to change values in the target state, from the action definition stored in action definition storing means 105.

If there is no matching state change rule, state changing means 101 determines that the current state after notification satisfies the state rule and does not notify anything to action determining means 102.

For example, in the example shown in FIG. 27, if the current state before notification is state σ0=(0,0,0,0,0) and event x1←1 is received, a state change rule with the combination is stored. Therefore, the target state is determined as state σ17=(1,0,0,0,1). Action determining means 102 determines an action for setting x5, which is a difference between state σ16=(1,0,0,0,0) that has become x1←1 in state σ0 and target state σ17=(1,0,0,0,1), to value of target state=1.

As described, according to the exemplary embodiment, policy compiling means 113 generates a state change rule when the model and the policy are designated. This can significantly speed up the process for events occasionally notified during operation of the managed system, compared to the second exemplary embodiment. As a result, it is advantageous in that finishing of the execution time of state changing means 101 within a certain time for searching the state change rule can be ensured, and carrying out of an action in real time after the reception of an event can be ensured.

Furthermore, when a state change rule is generated, the type of action (difficulty of immediate execution or whether manual execution is necessary) and the convenience requirements are taken into consideration based on the priority order to generate an optimal state change. Therefore, similar advantages as the advantages of the third exemplary embodiment can also be realized in the present exemplary embodiment.

In the exemplary embodiments, a configuration of a security operation management system is illustrated, the security operation management system comprising: state changing means for determining a state satisfying a state rule, which defines a desired state of a managed system, as a target state if the state of the managed system does not satisfy the state rule; and action determining means for determining a predetermined process, which is for changing the difference between the state of the managed system when the target state is determined and the target state, as a countermeasure that needs to be carried out in the state of the managed system when the target state is determined.

Furthermore, in the exemplary embodiments, a configuration of the security operation management system is illustrated, the security operation management system comprising: the state changing means for determining whether the current state of the managed system satisfies a state rule defining a desired state of the managed system and determining the state satisfying the state rule as the target state if the current state is not satisfied; and the action determining means for determining a predetermined process, which is for changing the difference between the current state of the managed system and the target state determined by the state changing means, as a countermeasure that needs to be carried out (see first exemplary embodiment).

Furthermore, in the exemplary embodiments, a configuration of the security operation management system is illustrated, wherein the state rule is indicated by a constraint equation related to predetermined state variables allocated to diagnostic items related to the security in the managed system, the state changing means determines the state of the managed system indicated by a combination of states of the diagnostic items satisfying the constraint equation as the target state if the current state of the diagnostic items collected from the managed system does not satisfy the constraint equation as the state rule, and the action determining means determines a process for changing diagnostic items, in which the current state is different from the states of the diagnostic items in the target state, among the diagnostic items collected from the managed system, to the states of the diagnostic items in the target state as a countermeasure that needs to be carried out (for example, see first exemplary embodiment).

Furthermore, in the exemplary embodiments, the security operation management system is illustrated, wherein the state rule is indicated by a constraint equation related to predetermined state variables allocated to diagnostic items related to the security in the managed system and an objective function for designating optimal values that the state variables need to take, and the state changing means determines a state of the managed system, which satisfies the constraint equation and which is indicated by a combination of states of diagnostic items determined as an optimal solution by the objective function as the state rule, as the target state if the current states of the diagnostic items collected from the managed system do not satisfy the constraint equation as the state rule (for example, see second exemplary embodiment).

Furthermore, in the exemplary embodiments, a configuration of the security operation management system is illustrated, the security operation management system comprising: policy information storing means for storing policy information defining requirements for the managed system; requirement-by-requirement state model storing means for storing a state model defining a state of the managed system when the requirement is satisfied, for each requirement defined by the policy information; and policy converting means for delivering a state rule defining a desired state of the managed system based on the policy information stored in the policy information storing means and the state model stored in the requirement-by-requirement state model storing means, wherein the policy converting means delivers a constraint equation, which limits values that state variables can take in the state of the managed system when the requirements that need to be satisfied are satisfied, and an objective function, which becomes maximum or minimum depending on values of state variables in the state of the managed system when all requirements that need to be satisfied as much as possible are satisfied, as state rules defining the system state satisfying as many requirements for the managed system as possible (for example, see second exemplary embodiment).

Furthermore, in the exemplary embodiments, a configuration of the security operation management system is illustrated, wherein the policy converting means distinguishes between the requirements that need to be satisfied and the requirements that need to be satisfied as much as possible in accordance with the type of requirement for the managed system (for example, see second exemplary embodiment).

Furthermore, in the exemplary embodiments, a configuration of the security operation management system is illustrated, wherein the types of requirement for the managed system include requirements related to security and requirements related to convenience (for example, see second exemplary embodiment).

Furthermore, in the exemplary embodiments, a configuration of the security operation management system is illustrated, wherein the policy converting means weights the values of the state variables in the state of the managed system when the requirements in the objective function are satisfied in accordance with the priority order of the requirements for the managed system (for example, see third exemplary embodiment).

Furthermore, in the exemplary embodiments, a configuration of the security operation management system is illustrated, wherein the policy converting means delivers an objective function that approaches a target maximum value or minimum value when the difference between the current state of the managed system and the target state is smaller (for example, see description related to policy variables $z1$ to $z5$ in the third exemplary embodiment).

Furthermore, in the exemplary embodiments, a configuration of the security operation management system is illustrated, wherein the policy converting means weights an amount of change in accordance with the difference in the objective function based on the executability of an action corresponding to the difference with the current state of the managed system (for example, see description related to policy variables $z2$ and $z4$ in the third exemplary embodiment).

Furthermore, in the exemplary embodiments, a configuration of the security operation management system is illustrated, the security operation management system comprising condition displaying means (for example, condition displaying means 111) for displaying a determination result of whether the system state of the managed system satisfies the state rule to a security manager or a user of the managed system.

Furthermore, in the exemplary embodiments, a configuration of the security operation management system is illustrated, the security operation management system comprising: action executing means (for example, action executing means 201) for executing, on the managed system, the predetermined process determined as the countermeasure that needs to be carried out by the action determining means.

Furthermore, in the exemplary embodiments, a configuration of the security operation management system is illustrated, wherein the security operation management system is set as the managed system. The exemplary embodiments are equivalent to an exemplary embodiment when computer 100 is managed system 200 as illustrated in the description of the first exemplary embodiment.

Furthermore, in the exemplary embodiments, a configuration of the security operation management system is illustrated, the security operation management system comprising state change rule generating means (for example, state change rule generating means 111) for generating in advance a state change rule defining the state, which satisfies the state rule, as the target state for the states that the managed system can take, based on the state rule defining the desired state of the managed system, wherein the state changing means determines the target state in accordance with the state change rule (see fifth exemplary embodiment).

Furthermore, in the exemplary embodiments, a configuration of the security operation management system is illustrated, wherein the state change rule generating means generates a state change rule defining the target state associated with conditions of changes in the diagnostic items occurred in the states, for the states that the managed system can take, and the state changing means determines the target state in accordance with the state change rule based on the state of the managed system and the condition of a change in a diagnostic item that occurred in the state (see fifth exemplary embodiment).

Furthermore, in the exemplary embodiments, a configuration of the security operation management system is illustrated, wherein the state rule is indicated by a constraint equation related to predetermined state variables allocated to diagnostic items related to the security in the managed system, and the state change generating means generates a data structure indicating all combinations of state variables not satisfying the constraint equation as a list of non-target states and generates a state change rule defining preventing a change to the non-target states for the states that are included in the data structure and that may change to the non-target states (see fifth exemplary embodiment). Here, generating the state change rule defining preventing a change to the non-target states indicates generating a state change rule defining a state other than the non-target states included in the data structure as the target state when a change in the diagnostic items in a state that may be switched to the non-target states changes to the non-target states.

Furthermore, in the exemplary embodiments, a configuration of the security operation management system is illustrated, the security operation management system comprising: policy information storing means for storing policy information defining requirements for the managed system; and requirement-by-requirement state model storing means for storing a state model defining states of the managed system when the requirements are satisfied, for each requirement defined by the policy information, wherein the state change rule generating means generates a state change rule defining changes between system states satisfying as many requirements for the managed system as possible based on the policy information stored in the policy information storing means and the state model stored in the requirement-by-requirement state model storing means (see sixth exemplary embodiment). The state change rule generating means here is realized by policy compiling means 113 of the sixth exemplary embodiment.

Furthermore, in the exemplary embodiments, a configuration of the security operation management system is illustrated, wherein the state change rule generating means distinguishes between the requirements that need to be satisfied and the requirements that need to be satisfied as much as possible in accordance with the type of requirement for the managed system (see sixth exemplary embodiment). Furthermore, in the exemplary embodiments, requirements related to security and requirements related to convenience are illustrated as an example of the types of requirement for the managed system.

Furthermore, in the exemplary embodiments, a configuration of the security operation management system is illustrated, wherein the state change rule generating means generates an optimal state change rule in accordance with the priority order of requirements for the managed system (for example, see algorithm of FIG. 21).

Industrial Applicability

The present invention can be applied to applications such as a security operation management apparatus comprising a single information device, a security operation management system for performing security operation management for the signal information device, a security operation management system for performing security operation management for an information system comprising a plurality of information devices, and a method and a program used for these.

Although the present invention has been described with reference to the exemplary embodiments, the present invention is not limited to the exemplary embodiments. Various changes that those skilled in the art can understand can be made to the configurations and details of the present invention within the scope of the present invention.

This application claims the benefit of priority based on Japanese Patent Application No. 2007-243819 filed Sep. 20, 2007 and Japanese Patent Application No. 2008-37571 filed Feb. 19, 2008, the entire disclosures of which are hereby incorporated by reference.

The invention claimed is:

1. A security operation management system for managing the security of a managed system including during operation of the managed system, the security operation management system comprising:
    state changing means for determining a state satisfying a state rule, which defines a desired state for the security of diagnostic items of the managed system, as a target state if the state of the managed system does not satisfy the state rule;
    action determining means for determining a countermeasure, which is for changing the state of the diagnostic items in a state different from the target state to the target state, as a countermeasure that needs to be carried out based on action information defined in advance
    wherein:
        the state rule is indicated by a constraint equation related to predetermined state variables allocated to diagnostic items related to the security in the managed system,
        the state changing means determines the state of the managed system indicated by a combination of states of the diagnostic items satisfying the constraint equation as the target state if the current state of the diagnostic items collected from the managed system does not satisfy the constraint equation as the state rule, and
        the action determining means determines a process for changing diagnostic items, in which the current state is different from the states of the diagnostic items in the target state, among the diagnostic items collected from the managed system, to the states of the diagnostic items in the target state as a countermeasure that needs to be carried out
    policy information storing means for storing policy information defining requirements for the managed system;
    requirement-by-requirement state model storing means for storing a state model defining a state of the managed system when the requirement is satisfied, for each requirement defined by the policy information; and
    policy converting means for delivering a state rule defining a desired state of the managed system based on the policy information stored in the policy information storing means and the state model stored in the requirement-by-requirement state model storing means,
    wherein the policy converting means delivers a constraint equation, which limits values that state variables can take in the state of the managed system when the requirements that need to be satisfied are satisfied, and an objective function, which becomes maximum or minimum depending on values of state variables in the state of the managed system when all requirements that need to be satisfied as much as possible are satisfied, as state rules defining the system state that satisfies as many requirements for the managed system as possible, and
    wherein the policy converting means weights the values of the state variables in the state of the managed system when the requirements in the objective function are satisfied in accordance with the priority order of the requirements for the managed system.

2. The security operation management system according to claim 1, wherein the policy converting means distinguishes between the requirements that need to be satisfied and the requirements that need to be satisfied as much as possible in accordance with the type of requirement for the managed system.

3. The security operation management system according to claim 1, wherein the types of requirement for the managed system include requirements related to security and requirements related to convenience.

4. A security operation management system for managing the security of a managed system including during operation of the managed system, the security operation management system comprising:
    state changing means for determining a state satisfying a state rule, which defines a desired state for the security of diagnostic items of the managed system, as a target state if the state of the managed system does not satisfy the state rule;
    action determining means for determining a countermeasure, which is for changing the state of the diagnostic items in a state different from the target state to the target state, as a countermeasure that needs to be carried out based on action information defined in advance,
    wherein:
        the state rule is indicated by a constraint equation related to predetermined state variables allocated to diagnostic items related to the security in the managed system,
        the state changing means determines the state of the managed system indicated by a combination of states of the diagnostic items satisfying the constraint equation as the target state if the current state of the diagnostic items collected from the managed system does not satisfy the constraint equation as the state rule, and
        the action determining means determines a process for changing diagnostic items, in which the current state is different from the states of the diagnostic items in the target state, among the diagnostic items collected from the managed system, to the states of the diagnostic items in the target state as a countermeasure that needs to be carried out,
    state change rule generating means for generating in advance a state change rule defining the state, which satisfies the state rule, as the target state for the states that the managed system can take, based on the state rule defining the desired state of the managed system, wherein the state changing means determines the target state in accordance with the state change rule, wherein:

the state change rule generating means generates a state change rule defining the target state associated with conditions of changes in the diagnostic items that occurred in the states, for the states that the managed system can take, the state changing means determines the target state in accordance with the state change rule based on the state of the managed system and the condition of a change in a diagnostic item that occurred in the state, the state rule is indicated by a constraint equation related to predetermined state variables allocated to diagnostic items related to the security in the managed system, and the state change rule generating means generates a data structure indicating all combinations of state variables not satisfying the constraint equation as a list of non-target states and generates a state change rule defining the prevention of a change to the non-target states for the states that are included in the data structure and that may change to the non-target states.

* * * * *